Figure 1:
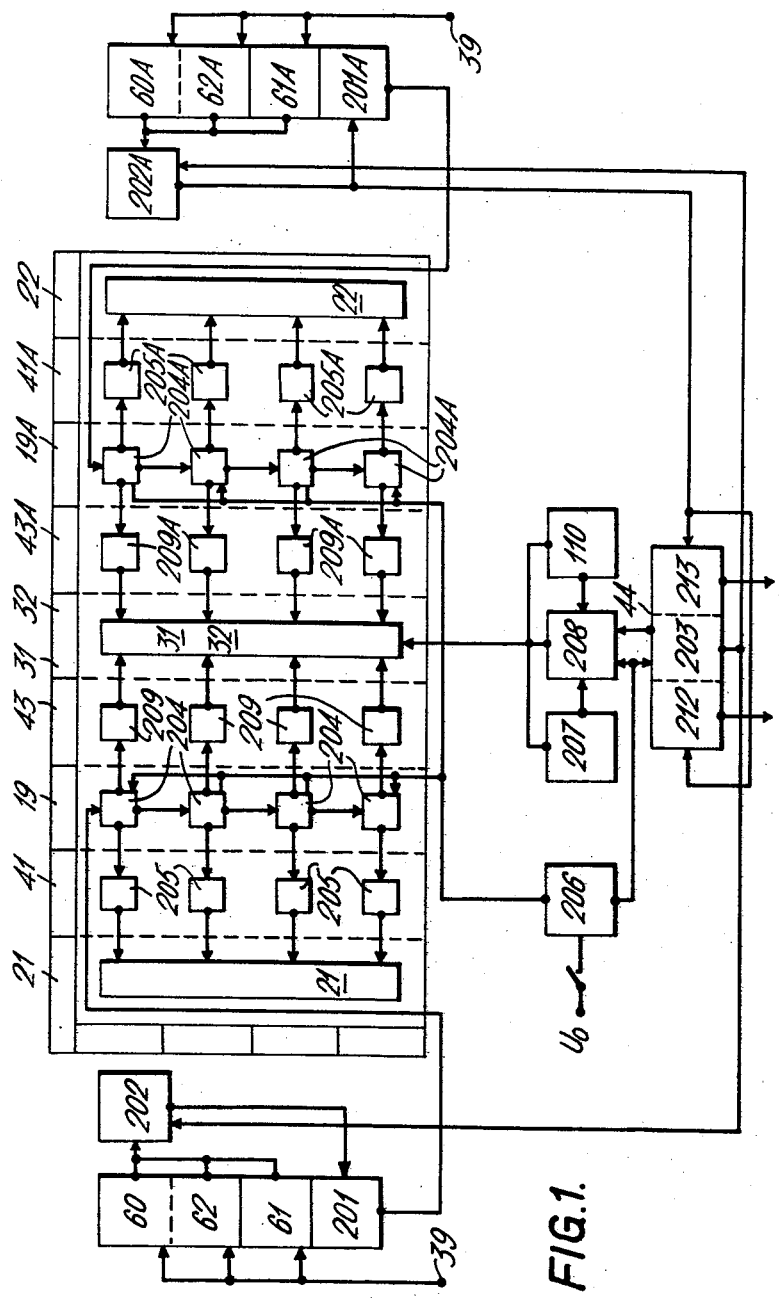

INVENTORS
RICHARD MORRISON PHILLIPS
DAVID JOHN LINDSAY-SCOTT
BY Morgan, Finnegan, Durham & Pine
ATTORNEYS April 28, 1964 R. M. PHILLIPS ETAL 3,130,868
METERING SYSTEM
Filed March 30, 1961 21 Sheets—Sheet 2
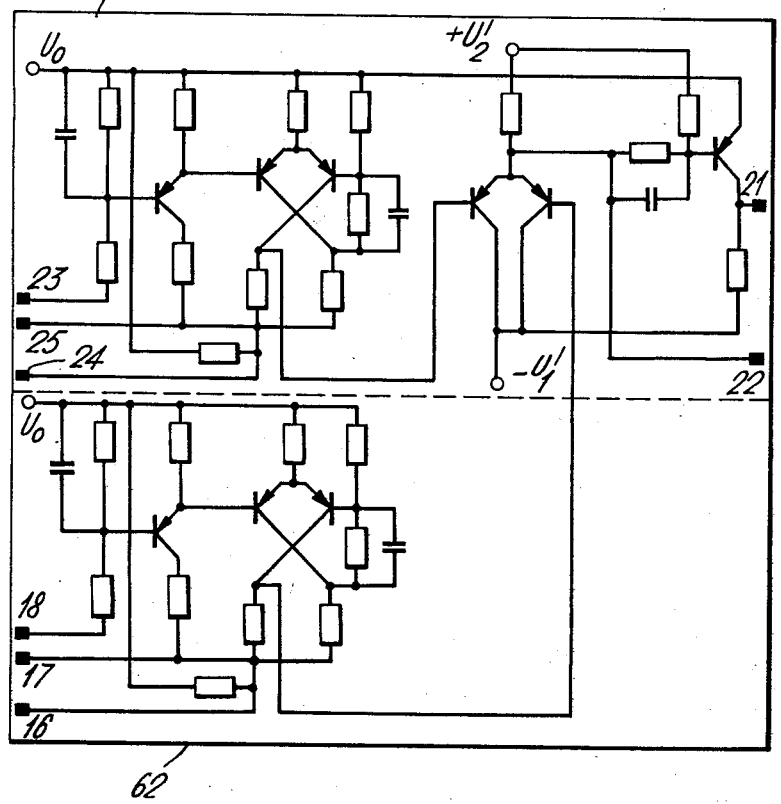
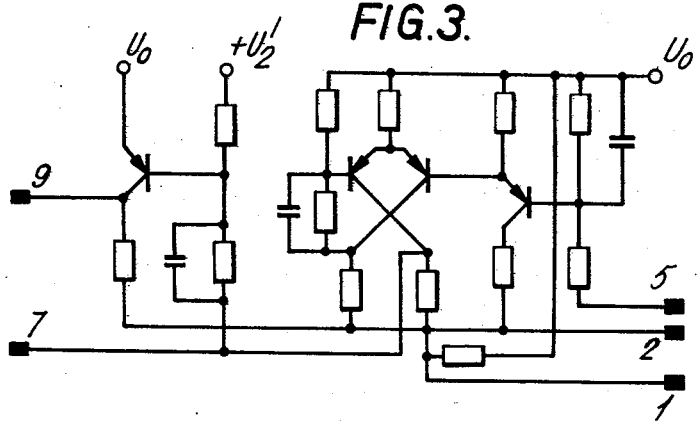
INVENTORS
RICHARD MORRISON PHILLIPS
DAVID JOHN LINDSAY-SCOTT
BY Morgan, Finnegan, Durham & Pine
ATTORNEYS INVENTORS
RICHARD MORRISON PHILLIPS
DAVID JOHN LINDSAY-SCOTT
BY Morgan, Finnegan, Durham & Pine
ATTORNEYS

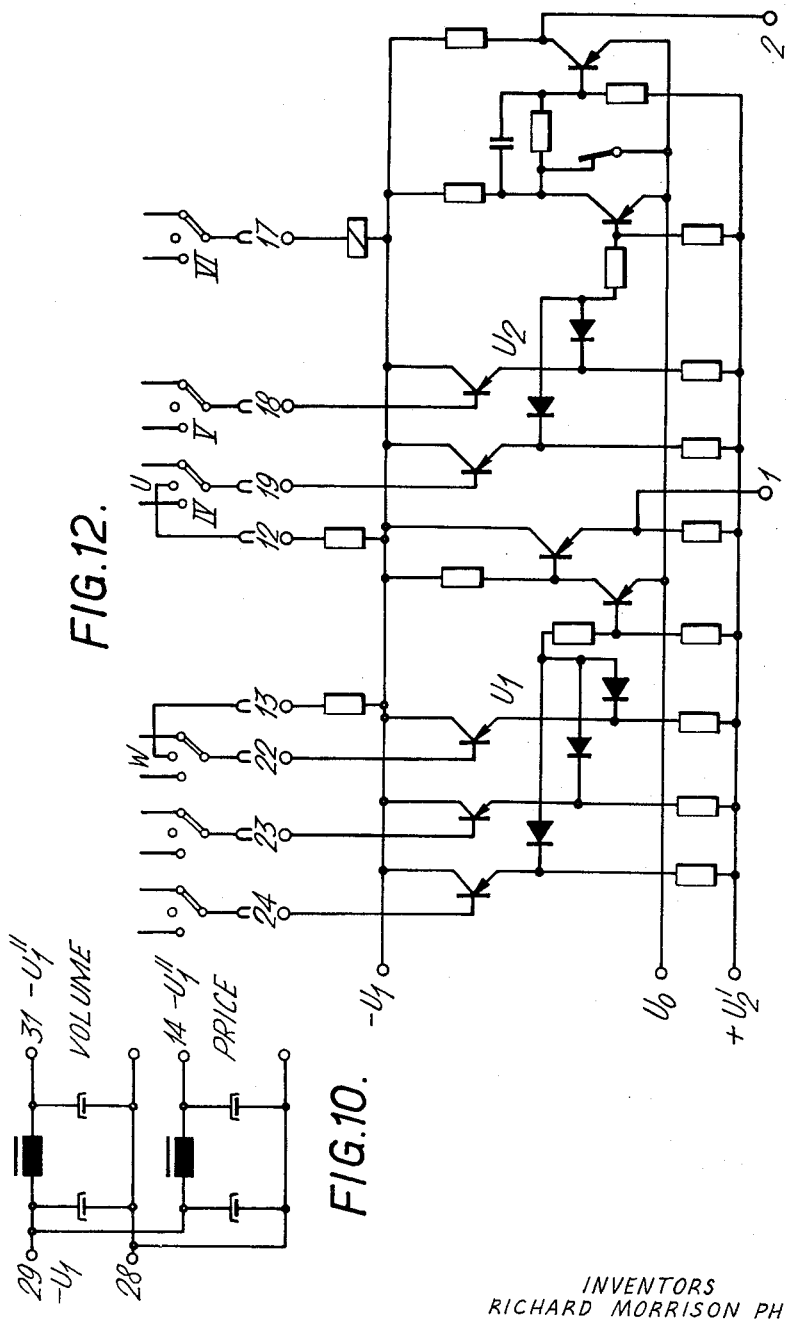

April 28, 1964   R. M. PHILLIPS ETAL   3,130,868
METERING SYSTEM
Filed March 30, 1961   21 Sheets-Sheet 10
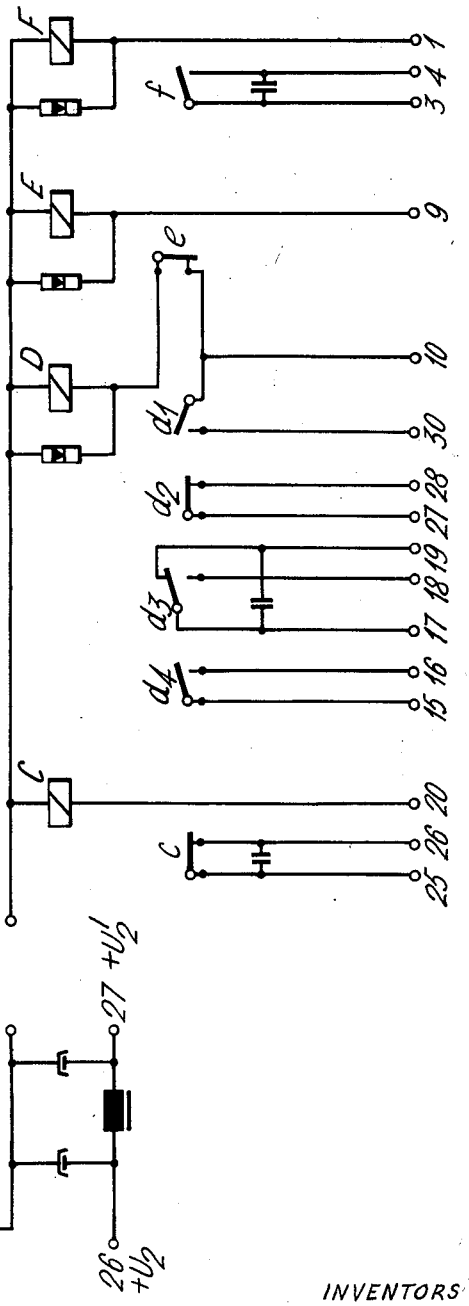
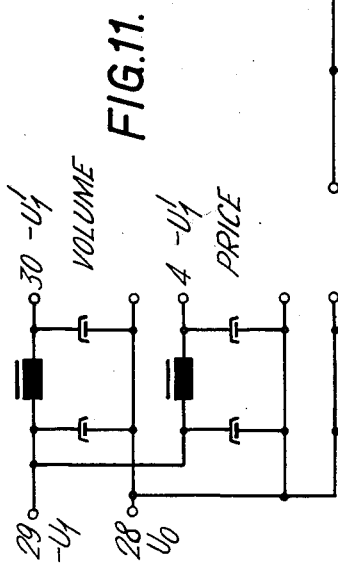
INVENTORS
RICHARD MORRISON PHILLIPS
DAVID JOHN LINDSAY-SCOTT
BY Morgan, Finnegan, Durham & Pine
ATTORNEYS

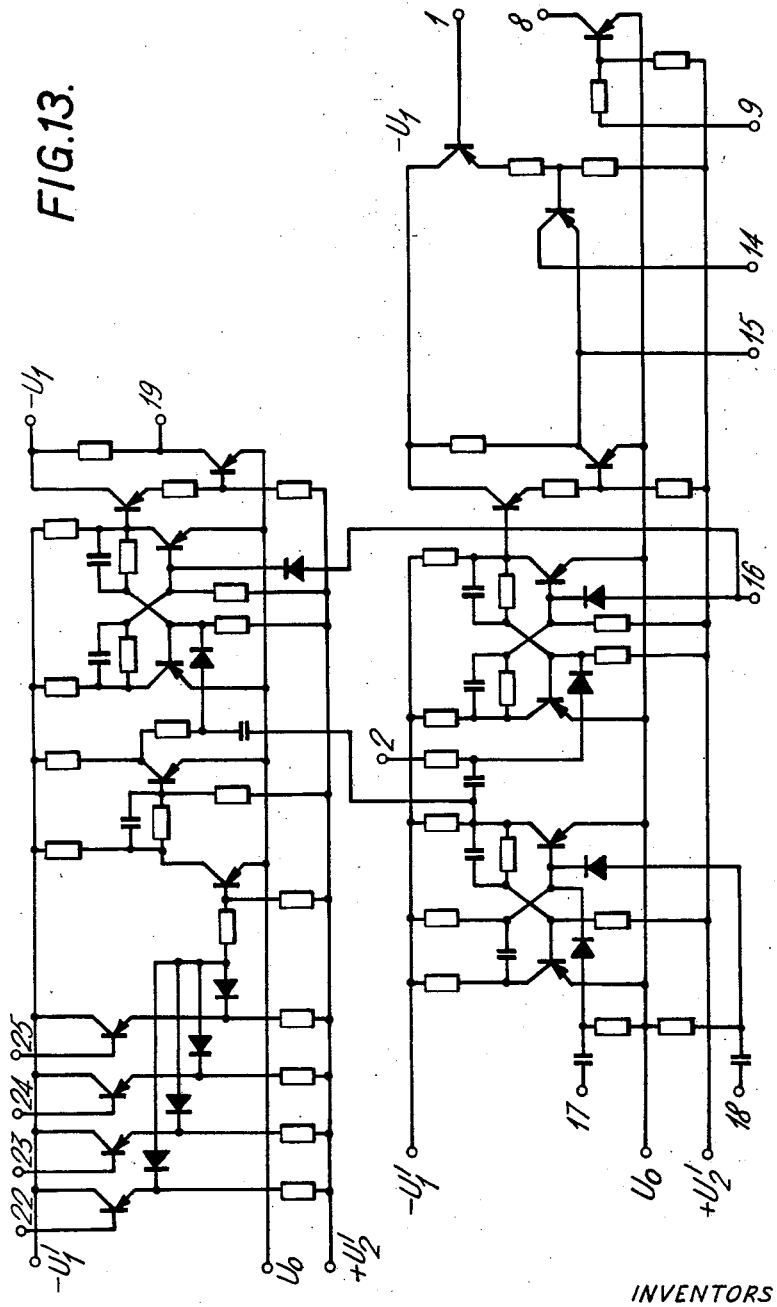

FIG. 15.
FIG. 16.
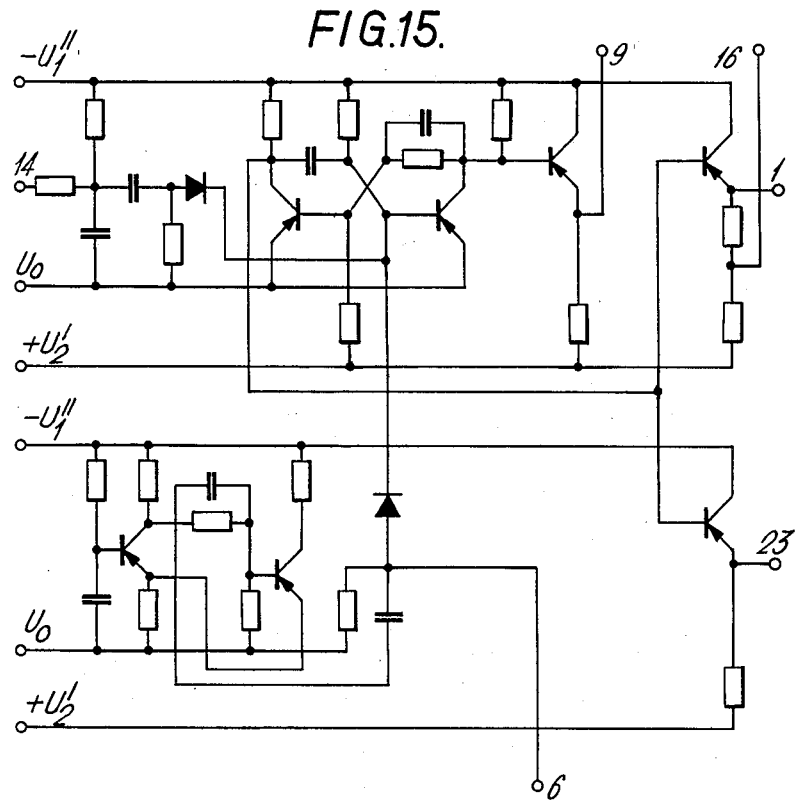
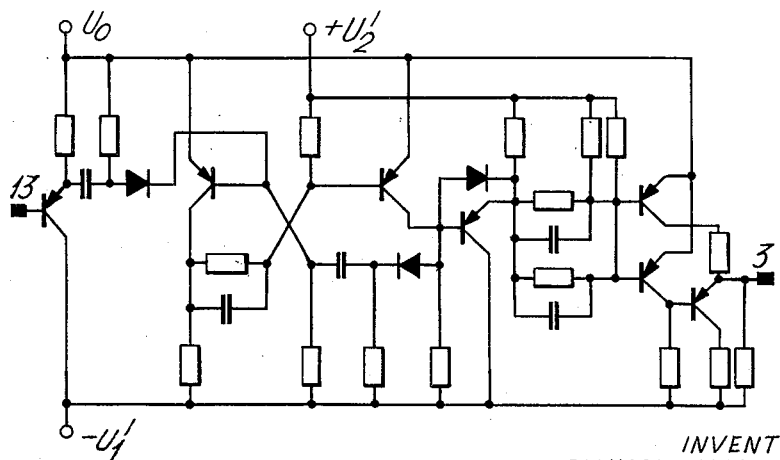

April 28, 1964 R. M. PHILLIPS ETAL 3,130,868
METERING SYSTEM
Filed March 30, 1961 21 Sheets-Sheet 14
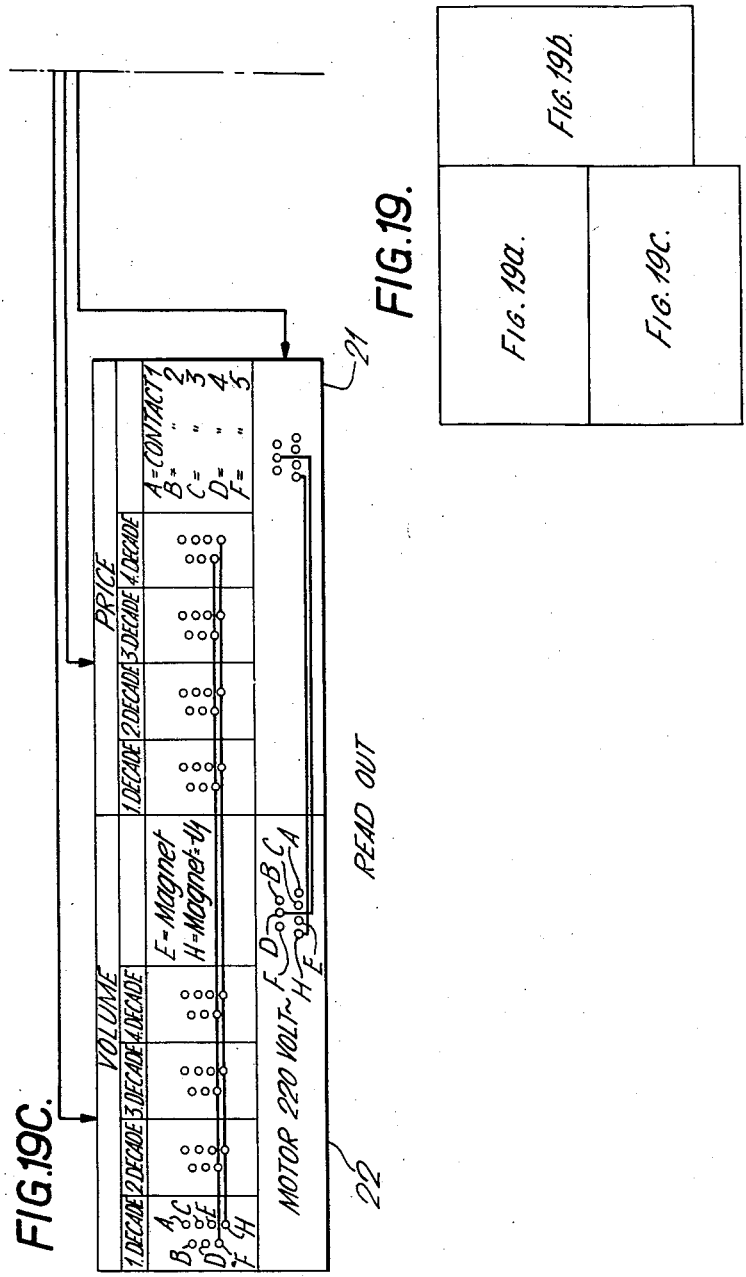
INVENTORS
RICHARD MORRISON PHILLIPS
DAVID JOHN LINDSAY-SCOTT
BY
ATTORNEYS

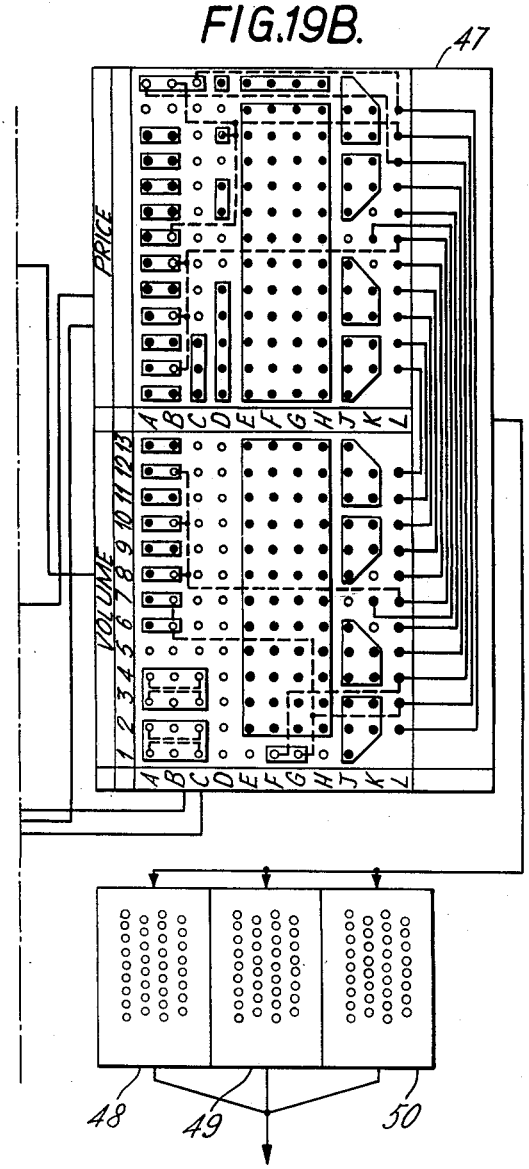

April 28, 1964  R. M. PHILLIPS ETAL  3,130,868
METERING SYSTEM
Filed March 30, 1961  21 Sheets-Sheet 20
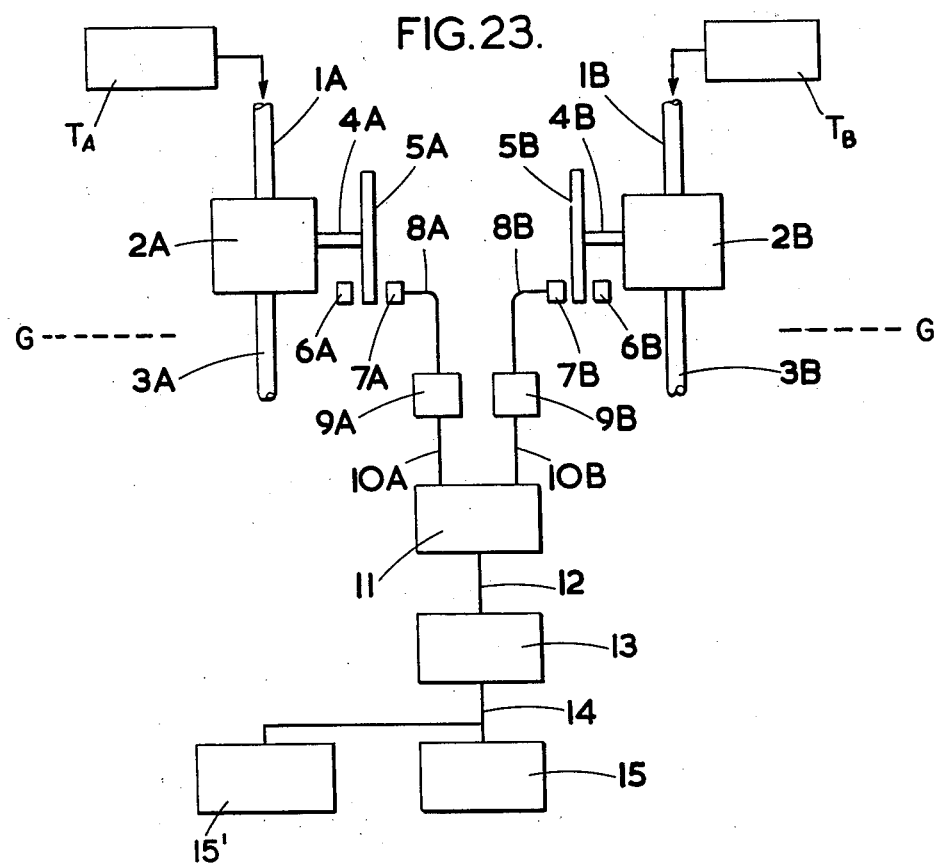
INVENTORS
RICHARD MORRISON PHILLIPS
DAVID JOHN LINDSAY-SCOTT
BY Morgan, Finnegan, Durham & Pine
ATTORNEYS

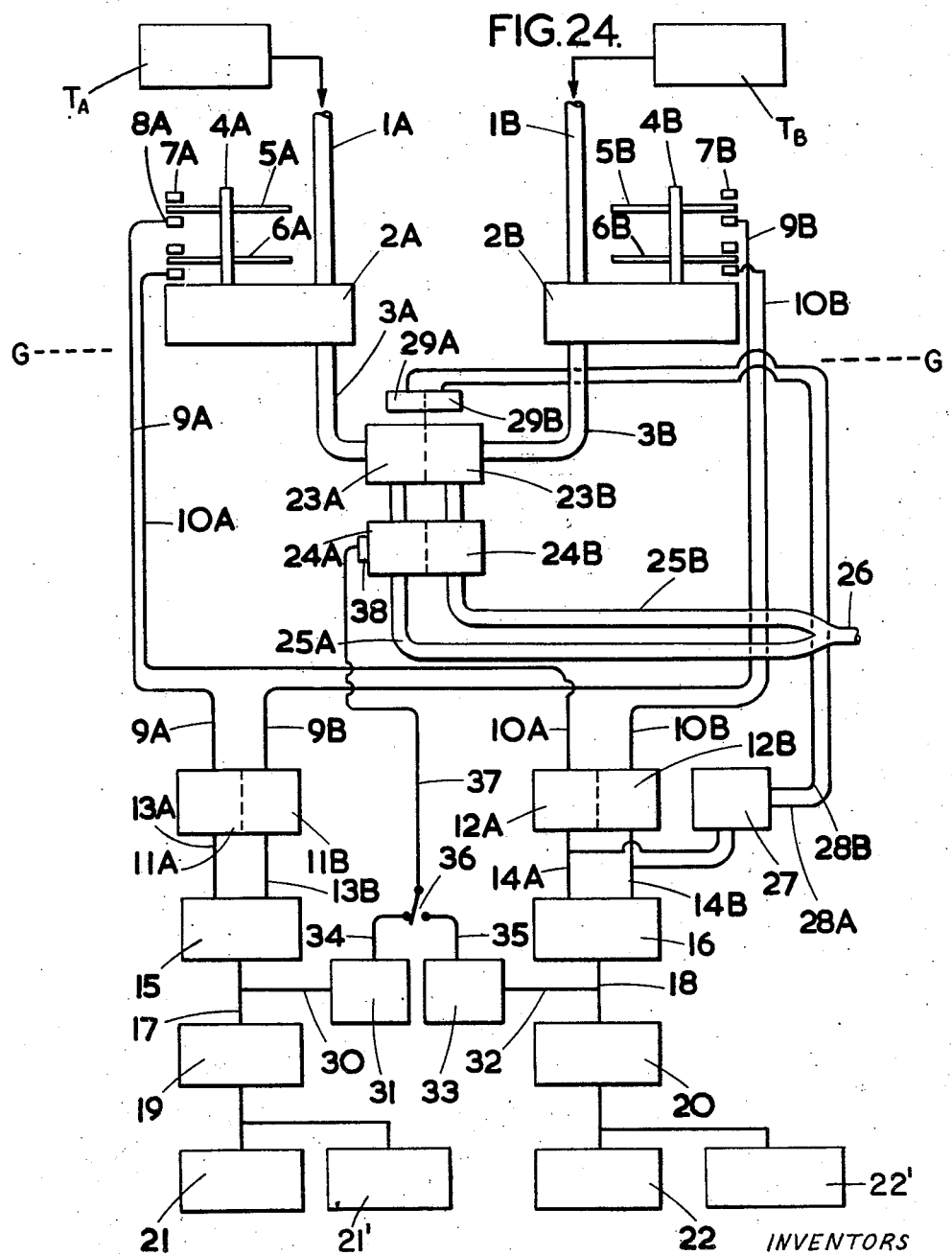

United States Patent Office 3,130,868
Patented Apr. 28, 1964

3,130,868
METERING SYSTEM
Richard Morrison Phillips and David John Lindsay-Scott, London, England, assignors to The British Petroleum Company Limited, London, England, and The de Havilland Engine Company Limited, Leavesden, Hertfordshire, England, both British joint-stock corporations
Filed Mar. 30, 1961, Ser. No. 99,416
Claims priority, application Great Britain Apr. 11, 1960
15 Claims. (Cl. 222—26)

This invention relates to an improved metering system. This invention also relates to an improved liquid product supply system comprising said metering system.

According to this invention there is provided a metering system comprising two meters, each adapted to measure a property of a different body of material and each connected to an electric signal transmitter giving a signal characteristic of the property measured, the system also comprising an electrical unit receiving the signals and giving an output signal which is a pre-determined function of the two input signals.

The output signal may be, for example, characteristic of (a) the sum of the values of the properties measured.
(b) the ratio of the values of the properties measured.
(c) the algebraic difference between the ratio of the values of the properties measured and a predetermined value.
(d) the point in time when the integral with respect to time of either of the values of the properties reaches a predetermined value.

According to one aspect of this invention there is provided a metering system comprising two meters, each meter (a) being adapted for use in association with a fluid stream to measure a property of the stream or of the material of the stream and (b) when in use being in association with a different fluid stream and (c) being connected to an electrical signal transmitter whereby there is provided a signal train, the signal, which is either recurring or continuous, or the signal interval at given time being characteristic of the property measured by the meter; said system also comprising an electrical summating unit adapted to receive simultaneously a signal train derived from each of the transmitters and adapted to provide an output electrical signal train of which the signal at said given time has a characteristic which is a function of the sum of the properties measured by the two meters at said time. According to a modification of this system, the characteristic is made a function of the integral of the sum of the properties measured by the two meters, said integral being taken over the period of operation of the meters. According to a further modification of this system the signal of the signal train provided by each transmitter is, at given time, made characteristic of the integral of the property measured over a period of operation of the meter.

According to another aspect of this invention there is provided a metering system comprising two meters, each meter (a) being adapted for use in association with a fluid stream to measure a property of the stream or of the material of the stream and (b) when in use being in association with a different fluid stream and (c) being connected to an electrical signal transmitter whereby there is provided a signal train, the signal train overall being characteristic of the integral of the property measured, said integral being taken over a period of operation of the meter; said system also comprising an electrical summating unit adapted to receive simultaneously a signal train derived from each of the transmitters and adapted to provide an output electrical signal train which overall is a function of the sum of the integrals of the property measured in respect of each stream.

If desired the metering system herein before described may comprise more than two meters, each meter being connected to an electrical signal generator and wherein the output electrical signal is a function of the sum of the properties as measured by any selected combination of meters or, if desired, as measured by all of the meters. Preferably the signal train provided by each electrical signal generator is a pulse train.

Preferably the output signal train provided by the electrical summating unit is a pulse train.

Usually the metering system will comprise an electro-mechanical device which gives visual indication of the sum of the properties measured.

Although this is not essential, in general each meter will be adapted to measure the same property. Properties so measured may be (a) inherent properties of the material constituting the stream, for example specific gravity, viscosity, specific thermal or electrical conductivity or color (b) extrinsic properties of the material, for example temperature and available heat and (c) properties of the stream, for example pressure, flow rate, linear velocity and quantity.

In certain cases it will be desired to provide a read-out of the total value. This would be the case for example when the property is measured in number of units of volume or number of units of weight, or in units which are a multiple of quantity and a variable such as, for example octane number (in which case the read-out might be in numbers of barrel-octane). In some other cases it will be desired to provide a read-out of a mean value. This may be the case for example when the property measured is temperature, specific gravity or viscosity. A read-out of the arithmetic mean will, of course, be half the arithmetic sum; other mean values can be derived by feeding a signal pulse which is a function of the value of the property into the summating unit.

The invention will hereinafter be described with reference to a system for the measurement of quantity; this however is merely illustrative and the invention is not limited to this type of system.

According to this aspect of the invention there is provided a metering system comprising two meters, each meter (a) being adapted for use in a fluid stream and being responsive to the quantity of fluid passing in association with the meter, or to the flow rate of fluid passing in association with the meter, (b) being in use, connected to a different fluid stream and (c) being connected to an electrical signal transmitter whereby there is provided a signal train, the signals being recurring or continuous, the train being characteristic of the quantity of fluid which has passed the meter; said system also comprising an electrical summating unit adapted to receive, simultaneously, from each electrical signal transmitter the signal train or a modified signal train derived from the initial signal train and adapted to provide an output signal or signal train which, either at given time or overall, is characteristic of the sum of the quantities of the fluids which have passed the two meters in a given period of time.

Preferably each meter will measure the passage of unit quantity of fluid as a pre-determined angle of rotation of an output shaft. The meter may be of any type by which this effect is achieved. Preferably the meter is in the form of a power driven positive displacement pump whereby the fluid stream is both brought into motion or assisted in motion and is metered.

Preferably the transmitter is adapted for operation by a rotating shaft and is adapted to generate a pulse train wherein each pulse corresponds to a pre-determined angle of rotation of the shaft; in association with the preferred type of meter described hereinbefore, the passage of unit quantity of fluid will give rise to one pulse. Preferred transmitters are as described in our copending British patent application Nos. 19859/59 or 36192/59 and 12789/60 (cognate).

Preferably the pulse train is subjected electronically to pulse shaping to derive a modified pulse signal of rectangular wave form.

Preferably the output signal of the summation unit is a pulse train and suitably this train is fed to an electro-mechanical device in which each pulse gives rise to a predetermined angle of rotation of an output shaft. This output shaft may be connected directly to a visual read-out for example a decade counter. Preferably, however, the output shaft is employed to generate further trains of electrical signals, each train being used in association with a different digit on the first counter of a bank of decade or similar counters in such manner that a predetermined change in any one signal train causes a rotating digital read-out drum to be arrested in a position characteristic of the digit associated with this signal train. Alternatively the output signal of the summation unit is fed to an electronic digital decade counter which will channelize impulse signals suitably to operate a read-out system. Preferred read-out systems are described in our copending British patent application No. 21860/60 or in German patent application No. 630827 ix 42p.

If desired the metering system may comprise three or more meters, each being as hereinbefore described and having associated therewith an electrical signal transmitter. If desired, a switch may be provided whereby any one or more (including all) transmitters are at given time connected to the electrical signal summating unit. It will be understood that in the case where a single transmitter is connected to the summating unit, the output signal will be characteristic of the output of the single meter served, without summating effect.

The metering system of this invention is particularly suitable for use in a liquid product dispensing system, for example, a petrol dispensing system for use in the sale of petrol for use in automobiles. The dispensing system will be adapted for the dispensing of blends of liquid products and by means of a metering system as hereinbefore described will provide an indication of total flow rate or total quantity of liquid product passing a meter, selected meters or all meters in given time, according to the particular type of metering system employed.

According to another aspect of this invention there is provided a metering system comprising two meters, each meter (a) being adapted for use in a fluid stream and being responsive to the quantity of fluid passing in association with the meter or to the flow rate of fluid passing in association with the meter, (b) being in use, connected to a different fluid stream and (c) being connected to an electrical signal transmitter whereby there is provided a signal train, the signals being recurring or continuous, the train being characteristic of the quantity of fluid which has passed the meter in given time, said transmitter, or if desired a second transmitter coupled to the first transmitter, providing a second signal train, the signal being recurring or continuous, the train being characteristic of the total price of the fluid passing in association with the meter in a given period; said system also comprising an electrical summating unit adapted to receive the signal trains or modified signal trains derived from the initial signal trains and adapted to provide two output signals or signal trains, one of which, at given time or overall, is characteristic of the sum of the quantities of the liquid products which have passed the meters and the other of which, at given time or overall, is characteristic of the sum of the total price of each of the liquid products which have passed the meters. Preferably two summating units will be employed, one being used to summate pulse trains which are characteristic of quantity and the other to summate pulse trains which are characteristic of price.

A dispensing system may comprise a read-out system as hereinbefore described.

Preferably the summating unit of the metering system comprises a scanning unit adapted to scan each shaped pulse train at least twice during the duration of each pulse and adapted to give rise to a signal when a shaped pulse is detected on at least two occasions during the duration of the pulse.

Preferably the summating unit of the metering system also comprises an integrating unit adapted to receive signals from said scanning unit and adapted to give rise to two consecutive signals if two signals are received simultaneously from said scanning unit.

Preferably the summating unit of the metering system also comprises a digital electronic counter adapted to receive signals from said integrating unit.

Suitable electrical transmitters for use in the present invention are as follows. In each case the transmitter will be operated in response to the movement of a rotating shaft.

In one system, each transmitter drive shaft carries a cam or one or more arms which make and break an electrical circuit to give any predetermined number of pulses per revolution.

If desired, there may be used an electrical pulse generator element consisting of at least two endless tracks, each track being adapted to operate in conjunction with a follower and to give rise to a pulse signal when relative movement takes place between the track and an associated follower, at least two followers being provided whereby, in use, at least two pulse signals are derived simultaneously.

According to a modification of the transmitter last described, the pulse generator element will comprise an endless track, adapted to operate in conjunction with a follower and to give rise to a pulse signal, and a set of units consisting of at least two units, each unit bearing at least one endless track, as hereinbefore described, and being adapted for attachment to the element in such manner that, in use, the tracks of the element and unit attached thereto constitute a source of two trains of pulse signals having a fixed ratio of pulses per unit time, said ratio being of a value which is variable by the use of a different unit of said set.

With reference to the transmitters, having tracks as hereinbefore described, each or any of the tracks may consist of alternate sections of electrically conducting and non-conducting material; the track will be used in conjunction with a follower consisting of an electrical contact whereby a pulse train is constituted when relative movement takes place between the track and follower. Usually all conducting sections of a given track will be electrically connected; if desired, current may be passed to and/or from these sections by means of a second contact in continuous connection with a conducting track.

In accordance with another form of construction the track may be shaped to impart mechanical movement to a follower, for example a stylus, and this movement employed to generate a pulse train in any suitable manner, for example by using techniques well-known in the construction and performance of phonographic pick-up units. If desired a track consisting of alternate hills and valleys may be employed as a cam surface to effect the alternate opening and closing of a pair of contact points.

In accordance with another form of construction, each or any of the tracks may consist of alternate sections of differing ability for modifying a beam of light; this track, hereinafter referred to as a "light regulating track," will be used in conjunction with a follower consisting of a photoelectric device, for example, a photoelectric cell or a transistor, capable, under the action of a beam of light of variable strength of initiating, or of modifying the strength of an electric current. Preferably, the alternate sections will be opaque and non-opaque; preferably the non-opaque sections will be transparent. If desired, reflecting sections, for example, mirror sections may be alternated with non-reflecting sections. In use, the track will be illuminated, preferably by a directed beam of light, and the photo-electric device will be situated to receive light alternately of relatively high and low intensity as the different sections of the track in turn modify the light received from the initial source. Separate light sources may be employed for each track or a single light source may be employed for a number of tracks.

Suitably, according to the aspect of the invention last described, the track will be formed of an opaque material having perforations therein or having irregularities, for example, notches, along an edge, which constitute the non-opaque sections. Alternatively, the track may consist of a translucent or transparent material having relatively dark sections superimposed. Thus the track may be formed of photographic material, suitably processed.

Suitably, according to any of systems described hereinbefore, each track constitutes a ring upon the surface of a disc. If desired one track only may be provided on each disc and one or more discs mounted on a common axle. If desired one disc may be fixed to the axle and the other discs constitute a set from which a required disc may be selected and temporarily secured upon said axle. Alternatively, a plurality of tracks or all of the tracks may constitute a system of concentric rings upon a single disc. One or more followers may be adapted for movement, at the control of the operator, from one track to another; if desired each track may have its own follower and the required pulse trains selected by use of a mechanical or electrical switching system.

As a modification to the system described, the disc or discs may be replaced by (a) a cylindrical surface, or surfaces, upon which is or are carried the endless tracks or (b) an endless band or bands carrying the endless tracks.

While the apparatus may be designed for use with moving followers and stationary tracks, it will usually be found preferable to maintain the followers stationary and to employ rotating discs, cylinders or bands.

It will be apparent that a rotating shaft may be employed to drive a pulse generator, comprising a generator element in accordance with the invention, whereby there is obtained two pulse trains. In each pulse train, the number of pulses per unit time will be variable, being a fixed number of pulses per shaft revolution, and thus dependent upon rate of revolution of the shaft. However, irrespective of the rate of revolution of the shaft, the ratio of the number of pulses per unit time in the two pulse trains will be constant; similarly the ratio of total number of pulses in the two pulse trains for a given number of revolutions of the shaft will be constant. However, by exchanging one of the tracks for a further track having different pulse generating characteristics, said ratio of the number of pulses per unit time (and said ratio of total number of pulses) will be changed to a new value.

According to another aspect of this invention there is provided a liquid product supply system comprising a metering system as hereinbefore described, a read-out system, and a set of storage tanks, each tank being provided to contain a different liquid product and having associated therewith a pump, a meter having a mechanical output responsive to the quantity of product passed therethrough and a transmitter mechanically driven by the meter and adapted to transmit monitoring electrical signals, in response to the mechanical output of the meter, to the actuating mechanism of the read-out system.

It will be understood that in the simplest case a "set" of storage tanks consists of two tanks. Thus, for example, as applied to the sale of motor fuel, a selection may be given between regular and premium grades.

In a liquid product supply system, according to this invention, for dispensing fuel to vehicles it is preferred that storage tanks, pumps and meters be located below ground level, as hereinafter defined and the read-out system be located above ground level, as hereinafter defined.

By "ground level" we mean the level of the area within which vehicles would stand while being supplied from the system of this invention.

Suitably, in a system according to this invention for use in dispensing fuel to vehicles, the read-out system is portable. Thus a small portable read-out unit, connected to the remainder of the system by a flexible electrical lead, may be set up by the operator within view from the driving position of a vehicle to which fuel is to be supplied.

Suitably two read-out systems will be employed simultaneously for a given sale, these systems being adapted to operate electrically in parallel, one system being a fixed unit, located to provide indication to the operator of the quantity of fuel dispensed to a vehicle and a second system being a portable unit and adapted for location to provide indication at the driving position of said vehicle of said quantity.

It will be understood that in accordance with this invention a plurality of dispensing positions, each equipped with a metering system and set of supply hoses, may be operated using a single storage tank and pump for each different liquid material dispensed. A separate meter may be provided in association with each supply hose; alternatively, a single meter may be provided for each liquid material dispensed and an electrical selection system provided to enable only one dispensing position to be supplied through a given meter at given time. It will be apparent that, if desired, a compromise may be effected between these alternatives wherein, for operating convenience, certain dispensing positions share the use of a given meter.

It will be understood that the liquid product supply system according to this invention may comprise also conventional ancillary equipment, for example filters, air-separators, totalizers, supply hoses and supply nozzles.

It is believed that by the use of a liquid product supply system according to this invention it may prove possible to obtain substantial advantages in roadside fueling service, for example by:

(1) Reducing the number of curbside pumps which are necessary to supply products to provide standby equipment.

(2) Providing more room on the sales "island."

(3) Reducing the area required as standing space for vehicles since all products may be made available at one fuelling position. Thus at present time, by way of contrast, the sale of five products at five curbside pumps necessitates an "island" length of 15 feet. Furthermore:

(4) The indicator head may be self containing except for quick acting electrical connections and one actuating lever to operate the trigger nozzle loading device; in the event of this piece of equipment breaking down its replacement by a spare (which could be held at each station) would require only a few minutes of an operator's time and would not require skilled fittings.

Figure 18:
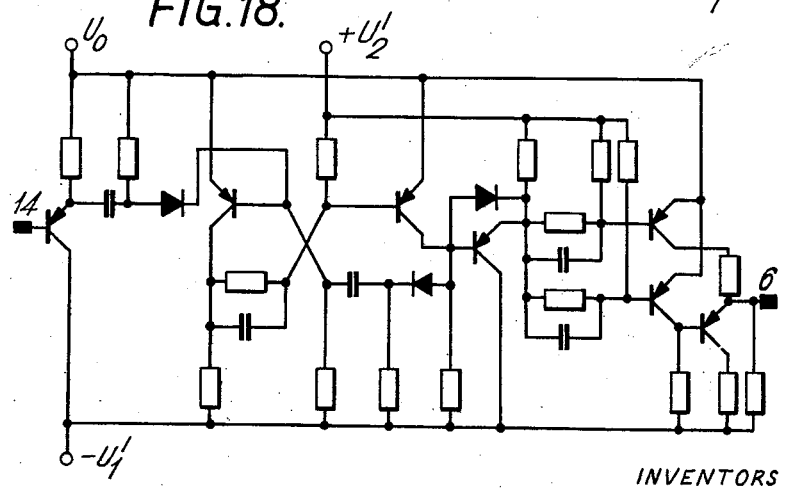
Figure 19A:
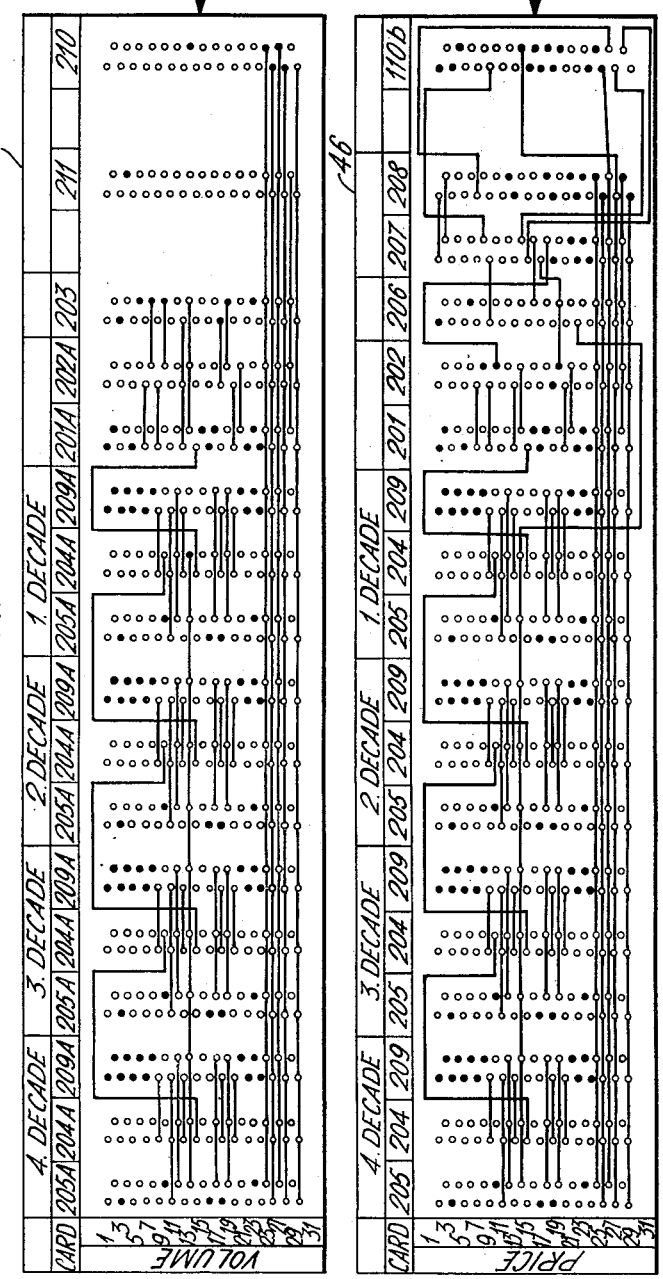
Figure 20:
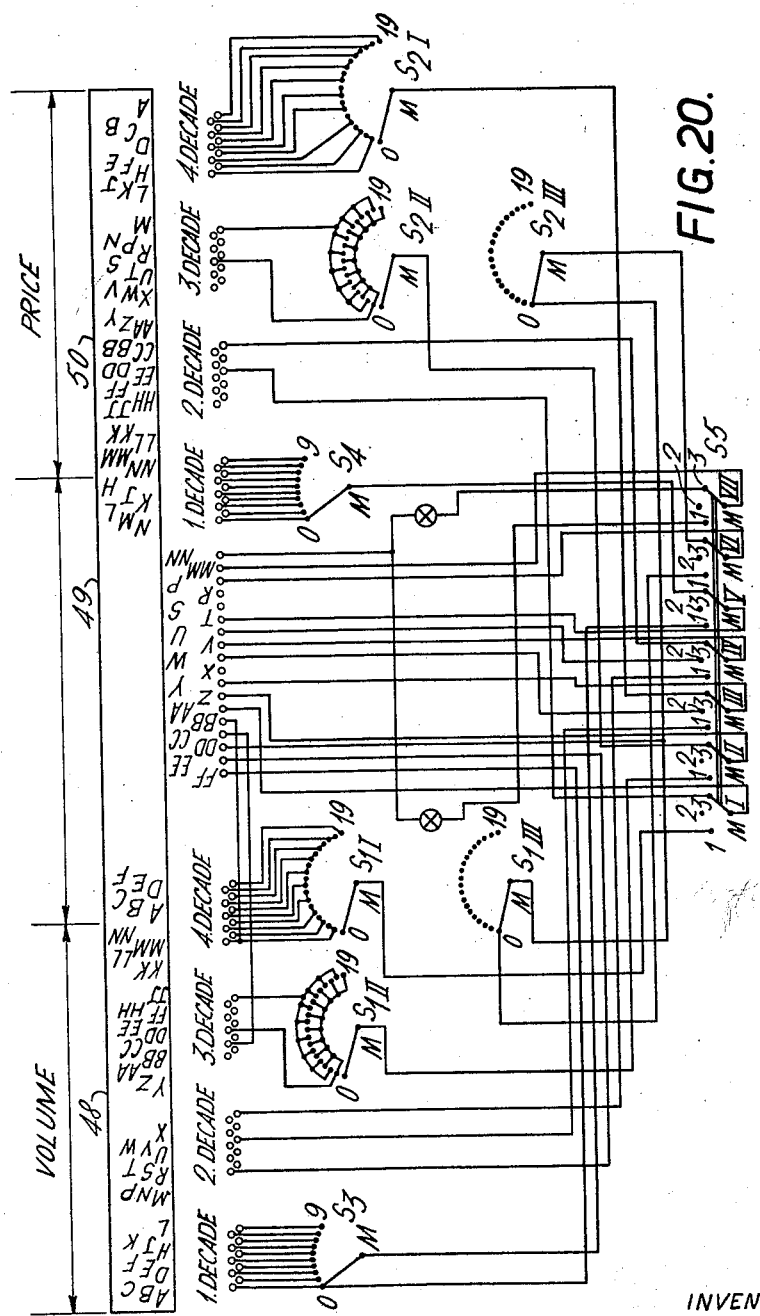
Figure 21:
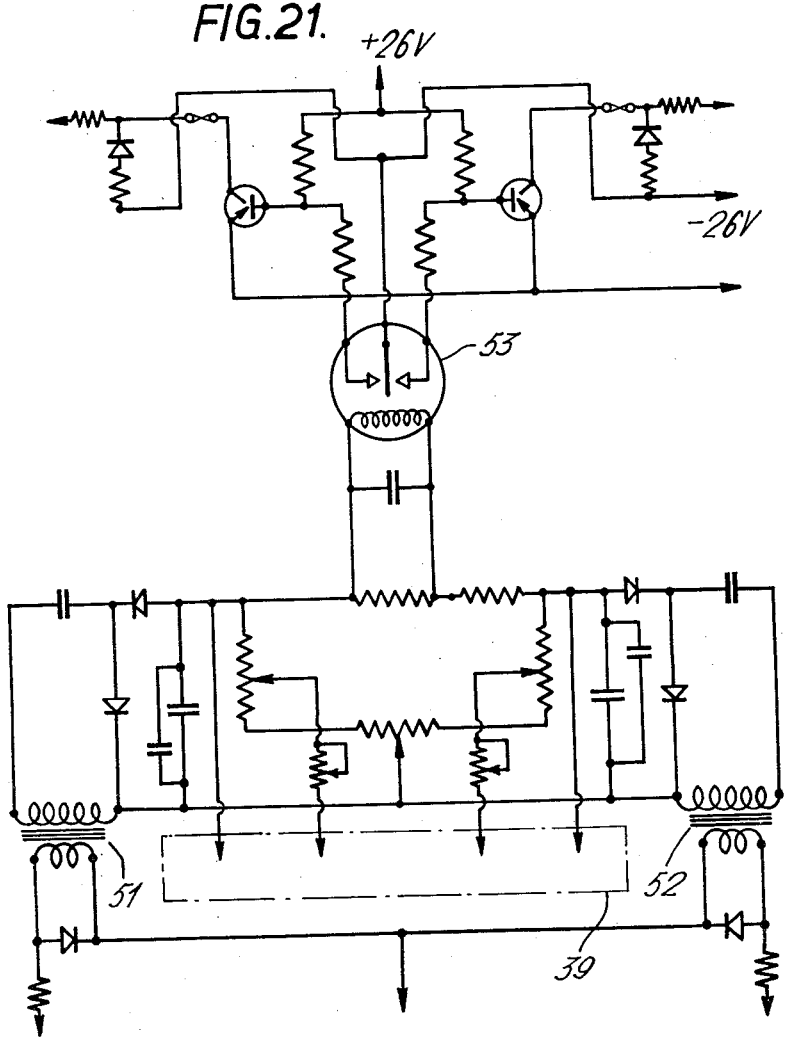
Figure 22:
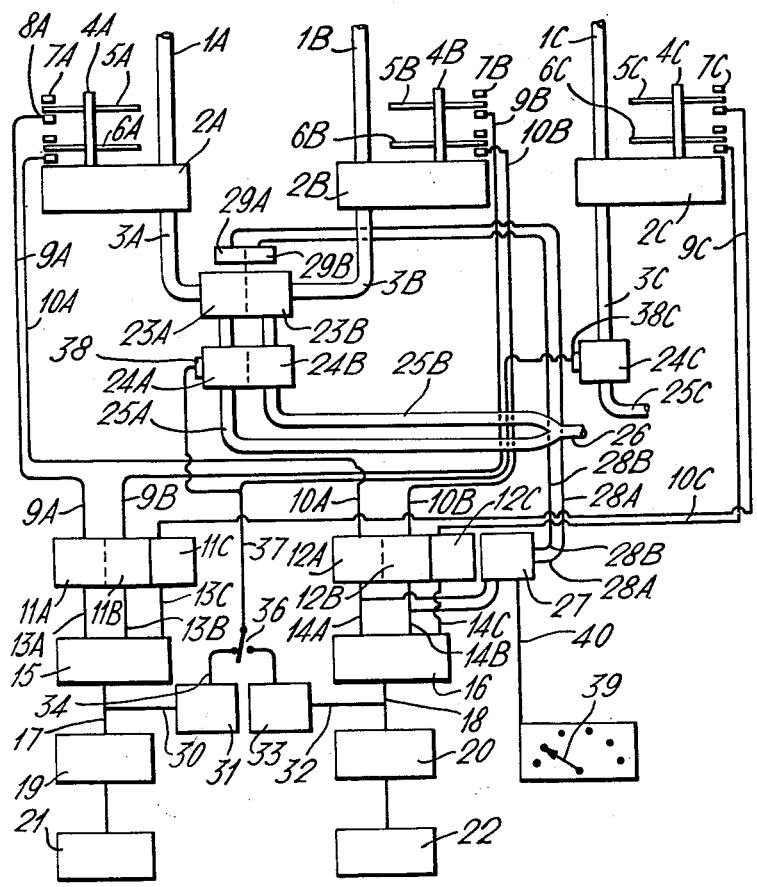

The invention is illustrated by but not limited with reference to the FIGURES 1–3, 4A, 4B, 5–19, 19A, 19B, 19C and 20–22 of the accompanying drawings, wherein FIGURE 1 is a block diagram of the electrical and electronic circuitry in the pulse generation, pulse summation, pre-set and read-out stages of the system described with reference to FIGURE 22, FIGURES 2, 3, 4A, 4B, 5–18 are circuit diagrams of the sections of the circuitry represented in block form by FIGURE 1, FIGURES 19A, 19B, 19C and 20 are representations of terminal boards whereby connections may be made from one section of the circuitry to another, FIGURE 19 is a block diagram showing the manner in which connections are made between the boards disclosed with reference to FIGURES 19A, 19B and 19C, FIGURE 21 is a circuit diagram of the blend control stage of the system, and FIGURE 22 is a schematic flow diagram of a system comprising fluid metering, pulse generation, pulse summation, blend control, pre-set and read-out stages, adapted to dispense either of two selected products, or a number of blends of fixed proportions of the two products, or a third selected product.

The invention is further illustrated by Tables 1–24 which supply information by means of which when taken in conjunction with the reference numerals on FIGURES 1–20, a lead may be traced from one section of the circuitry to another, and hence by means of which a complete circuit diagram may be constructed, the functions of the components of which will be apparent to those skilled in the art.

The invention is further illustrated by but not limited with reference to FIGURES 23 and 24 of the accompanying drawings corresponding to FIGURES 1 and 2 respectively of the drawings accompanying the provisional specification, wherein FIGURE 23 is a schematic flow diagram of a system comprising fluid metering, pulse generation and pulse summation stages and FIGURE 24 is a schematic flow diagram of a system comprising fluid metering, pulse generation, pulse summation, blend control, pre-set, and read-out stages.

With reference to FIGURE 23:

A liquid product supply line 1A in communication with storage tank $T_A$ is connected to flow meter 2A, preferably including a pump, take-off being by line 3A. The tank and meter with pump preferably comprise a section of the system disposed below ground level as symbolized by the dashed line G—G. Metering output is by rotating shaft 4A, connected to disc 5A which has alternate sectors of transparent and opaque material forming a ring near its periphery. A light source 6A is set to throw a beam through the transparent sectors, the beam being received by photoelectric cell 7A which, as a result of the interruption of the light beam during rotation of disc 5A, gives rise to a pulse train in lead 8A. This pulse train is fed to an electronic pulse shaping circuit 9A and a rectangular wave form pulse obtained thereby is fed by lead 10A to pulse summating unit 11.

Similarly, a second liquid product supply line 1B in communication with storage tank $T_B$ is used in a duplicate system to provide a second rectangular wave form pulse in line 10B which is also fed to the pulse summating unit 11.

From unit 11 a single pulse train is taken by lead 12 to pulse counting unit 13 from which a mechanical or electrical linkage 14 passes to read-out unit 15, and advantageously to similar portable unit 15'. The latter may be provided with its own pulse counter.

In operation, two fluid streams will pass, respectively, through lines 1A and 3A, and through 1B and 3B, the pulse trains generated in consequence being added in unit 11. The pulse train taken by lead 12 will be characteristic of the sum of the flow rates of the two liquid products and a read-out, in suitable units, for example Imperial gallons, will be provided by unit 15.

With reference to FIGURE 24:

A liquid product supply line 1A is connected to flow meter 2A, take-off being by line 3A. Metering output is by rotating shaft 4A, connected to discs 5A and 6A which each have alternate sectors of transparent and opaque material forming a ring near the periphery. A light source 7A is set to cast a beam through the transparent sectors of disc 5A, the beam being received by photoelectric cell 8A which, as a result of the interruption of the light beam during rotation of disc 5A, gives rise to a pulse train in lead 9A. Similarly disc 6A gives rise to a pulse train in lead 10A.

Similarly, a second liquid product supply line 1B is connected to meter 2B which is used in a duplicate system to provide pulse trains in leads 9B and 10B.

Pulse trains carried by leads 9A, 9B, 10A and 10B are modified by pulse shaping circuits 11A, 11B, 12A and 12B respectively to rectangular wave form, output being by leads 13A, 13B, 14A and 14B respectively.

Pulse trains carried by leads 13A and 13B are added in pulse summating unit 15; similarly pulse trains carried by leads 14A and 14B are added in unit 16.

The output pulse trains of units 15 and 16 are carried by leads 17 and 18 and are related to the flow of liquid product through meters 2A and 2B as follows:

Discs 6A and 6B are provided with a number of alternate sectors of transparent and opaque material such that the output signal carried by lead 18 has a convenient pulse frequency for subsequent use in a pulse counter. Disc 5A has a number of sectors which provide a pulse train in lead 13A which is a measure of the total price of the liquid passing through meter 2A; disc 5B has, in general, a different number of sectors proportional to the different price of the liquid passing through meter 2B and thus gives rise to a pulse train in lead 13B which is a measure of the total price of the liquid passing through meter 2B. The summated pulse train in lead 17 is a measure of the total price of the two liquids which have passed through the meters.

The pulse trains in leads 17 and 18 are passed to pulse counters 19 and 20 respectively which are connected, usually electrically or mechanically, to read-out indicators 21 and 22 respectively, and advantageously to corresponding portable indicators 21' and 22', respectively, which may in suitable cases be provided with their own respective pulse counters.

Control of blending is effected as follows:

Liquid products passing by lines 3A and 3B are fed to ganged valves 23A and 23B, thence by ganged throttling valves 24A and 24B to lines 25A and 24B and are blended in line 26.

From leads 14A and 14B signal pulse trains are fed to balance circuit 27 in which the signal pulses are converted to continuous variable strength signals and an output signal generated in one or other of lines 28A or 28B according to which input signal is over strength in relation to the other; pre-setting of the balance circuit permits a desired ratio to constitute the criterion. Leads 28A and 28B are connected to electromagnetic valve operating units 29A and 29B connected to ganged valves 23A and 23B respectively. Signals carried by leads 28A and 28B maintain the blend in line 26 at the previously selected blending ratio.

Pre-setting for the delivery of a pre-determined value or volume of total liquid product is effected as follows:

The pulse train carried by lead 17 is also fed by line 30 to pre-set unit 31; similarly the pulse train carried by lead 18 is fed by line 32 to pre-set unit 33.

Output from units 31 and 33 is taken by lines 34 and 35 to switch 36 which enables pre-setting to be based either on value or volume, according to the unit in circuit. Units 31 and 33 comprise trigger circuits and are activated to give an output signal or receipt of a pre-set number of pulses.

The output signal is carried from switch 36 by lead 37 to valve actuating unit 38 which on receipt of the signal shuts down ganged valves 24A and 24B.

Operation is as follows:

Balance unit 27 is set to the required blending ratio and, if pre-set of total supply is required, either unit 31 is set for total price or unit 33 is set for total volume, switch 36 being set accordingly. Valves 24A and 24B are opened and liquid product thereby allowed to pass through the meters to blend at 26, a continuous read-out of total price and volume being given by indicators 21 and 22. Blending ratio is continuously maintained in adjustment by unit 27 acting on valves 23A and 23B. When the required quantity of liquid product has been passed through the meters, valves 24A and 24B will close.

Between operations, read-out digits will be re-set to zero.

The system is particularly suitable for the sale of liquid fuels for use by motor vehicles at roadside supply or service stations. With reference to FIGURE 22:

The system is as described with reference to FIG-

URE 24 with the addition of a third set of units, designated by the suffix "C," identical to those described with reference to FIGURE 24 with the exception that a blend control valve is not provided.

A selector switch 39 connected by means of a lead 40 to the blend control circuit 21 is provided whereby the system may be selected to dispense either the first liquid product or the second liquid product or any one of a number of preselected blends of the first and second liquid products or the third liquid product. With reference to FIGURES 1–3, 4A, 4B, 5–18 and 22:

Pulses from price transmitter 5A and/or price transmitter 5B or price transmitter 5C, according to the setting of selector switch 39, are fed into pulse shaping circuits 60 and/or 61 or 62, respectively, from which they emerge in rectangular wave form. Pulse shaping circuits 60 and 62 are disclosed in diagrammatic form by FIG. 2, pulse shaping circuit 61 by FIG. 3.

When a selected blend of two selected fluid products is dispensed, pulses are transmitted concurrently from transmitters 5A and 5B.

Figure 4A:
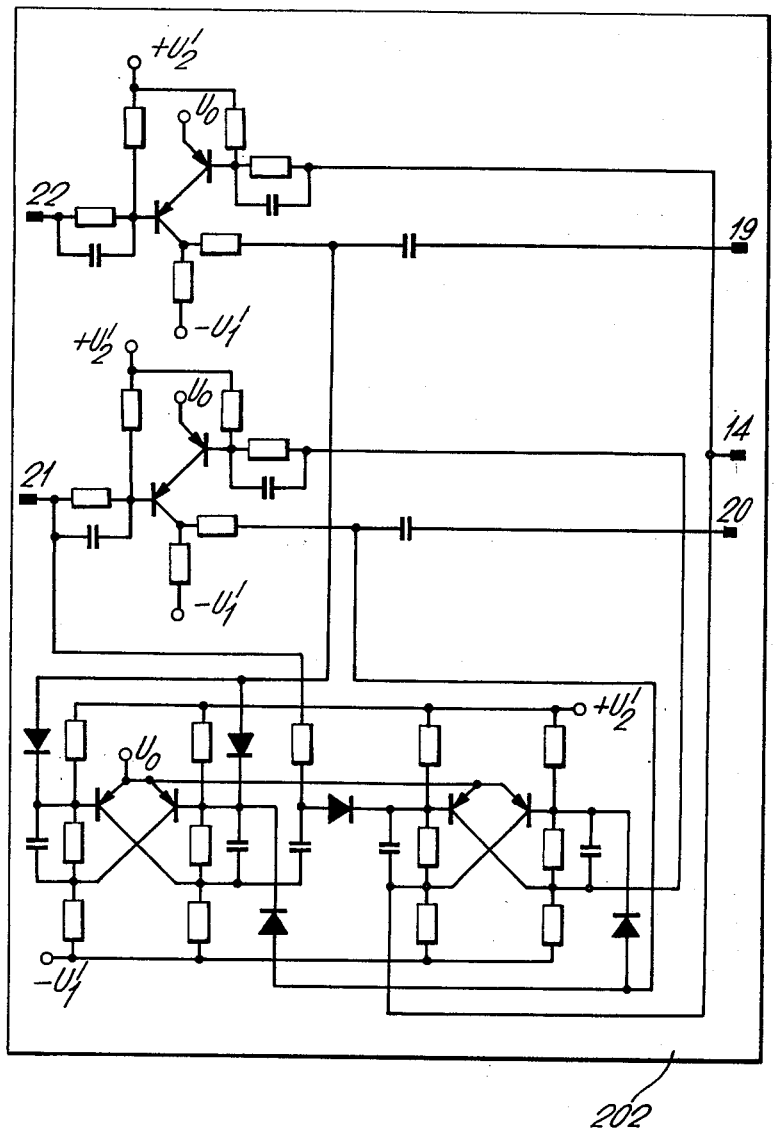
Figure 4B:
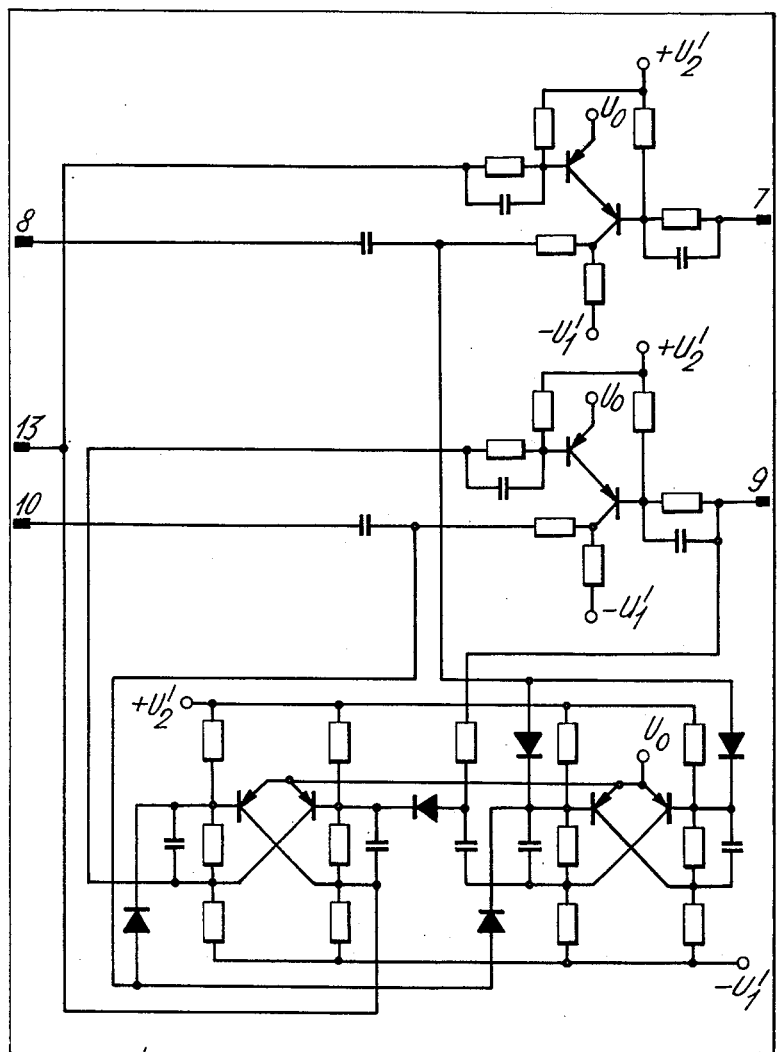
Figure 7:
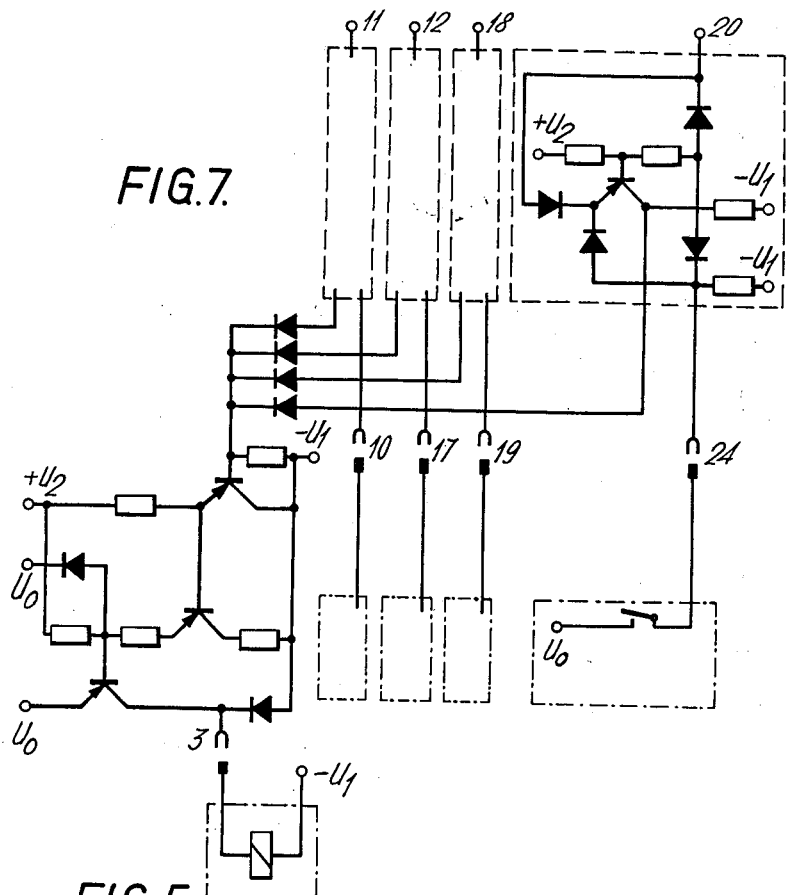

Shaped pulses from circuits 60 and/or 61 or 62 are then channelled to electronic scanning unit 202 disclosed by FIG. 4A in which an electronic switch scans each pulse channel at a rate which is approximately six times as fast as the maximum pulse input frequency. A signal is generated by scanning unit 202 if and only if a channel is scanned at least twice and a shaped pulse is detected on each occasion. Spurious pulses are therefore not recognized by the scanning unit and do not give rise to signals therefrom.

Figure 5:
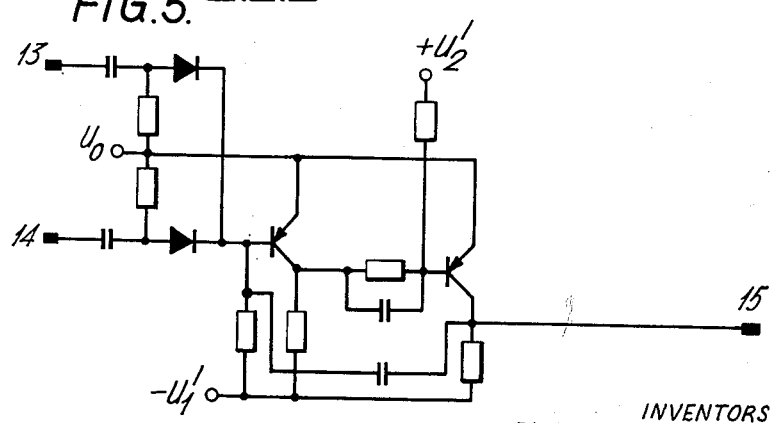

Signals from the scanning unit 202 are then fed into integrating unit 201 disclosed by FIG. 5 which integrates and transmits signals received from the scanning unit to pulse counter 19. If two signals are fed simultaneously to integrating unit 15, an extra pulse is triggered off therein and two signals are fed to counter 19.

Figure 6:
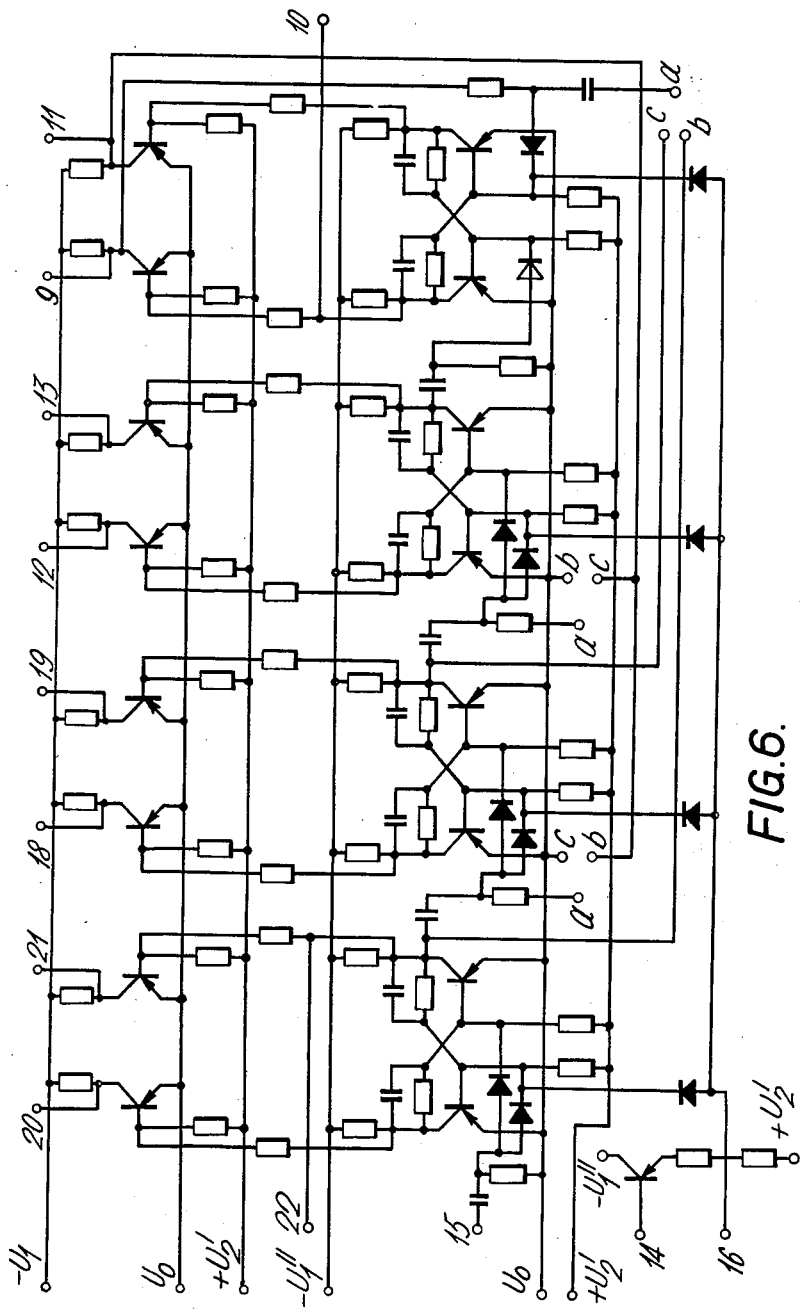

Counter 19 is of the four decade digital type and comprises four circuits 204, each disclosed by FIG. 6. Output signals from each circuit of counter 19 are then amplified by means of a drum controller, comprising four circuits 205, each disclosed by FIG. 7, and then supplied to read out systems 21 and 22 disclosed by German patent application No. 630827 ix 42 p.

Figure 8:
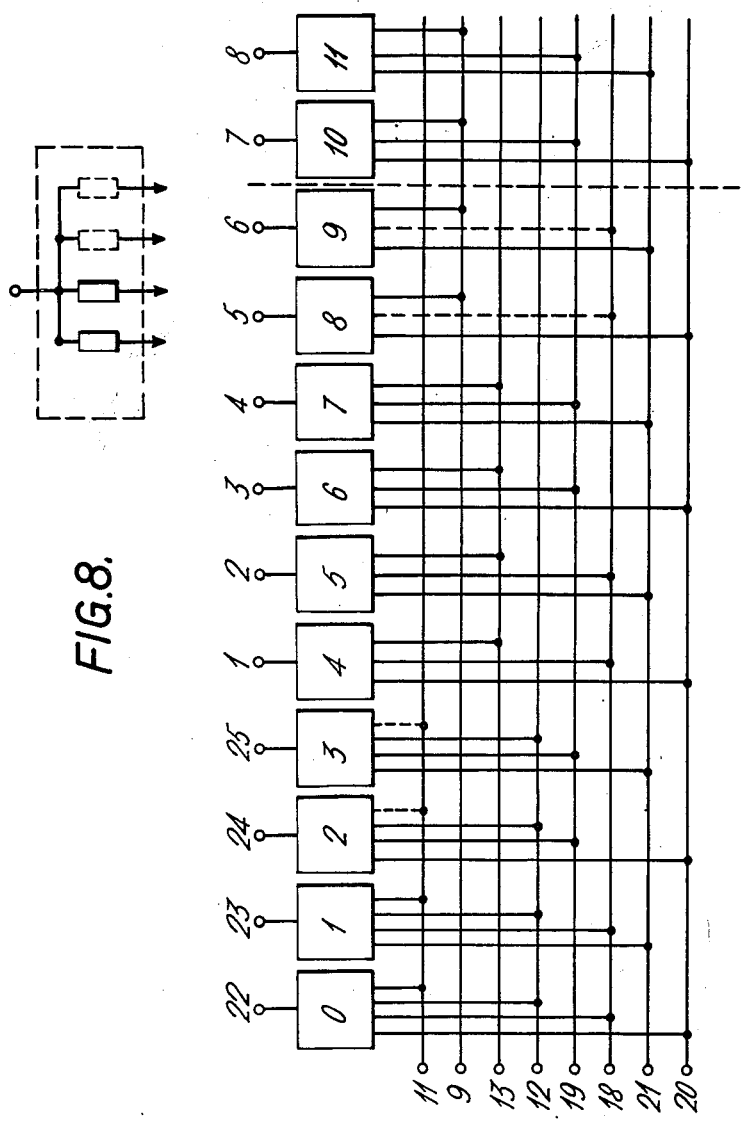
Figure 9:
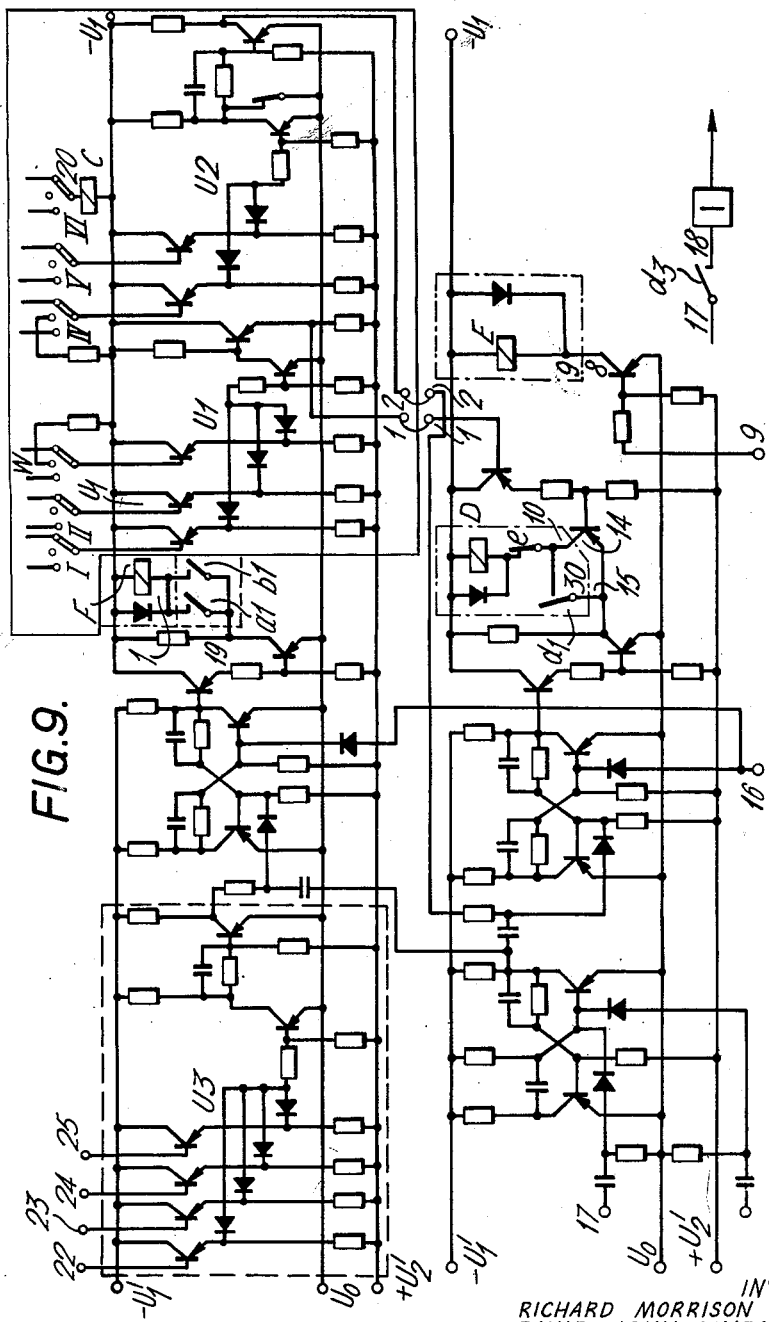

Output signals from each circuit of the counter are also fed by means of distributor 43, each distributor comprising four tracks, each track disclosed by FIG. 8, into pre-set selector switch units 31, 32, disclosed by FIG. 12.

The circuits and units described to this point constitute apparatus for measuring and presetting the value of the product which may be dispensed by the system. The system also comprises a second set of circuits and units, for measuring and presetting the volume of the product which may be dispensed from the system, identical to the units so far described; these are identified in FIG. 1 by the addition of the suffix "A" to the reference numerals. At a predetermined number of pulses before delivery of the pre-set value or volume of fuel, corresponding to a predetermined total number of pulses, a first signal pre-set unit 207 disclosed by FIG. 12, is energized. Unit 207 in turn energizes a pre-set trip solenoid or solenoids controlling shut off valves 24A and/or 24B or 24C which thereupon partially close, being prevented from closing completely by a latch. Unit 207 also triggers second signal preset unit 208, disclosed by FIG. 13, which then responds to pulses received subsequently until the time required to receive the number of pulses required to complete the predetermined total number of pulses equals the time required to close the valve or valves completely, whereupon the latch is released and the valve is allowed to close completely.

Screening circuits 210 and 211, disclosed by FIGS. 10 and 11, are provided.

A system of hold in relays 110 is disclosed by FIG. 14.

Start up unit 206, disclosed by FIG. 15, is provided which, when an appropriate nozzle is removed from its holder, runs the drums of read out systems 21 and 22 to zero, energizes valve actuating mechanism 38 or 38C and switches itself off again.

Figure 17:
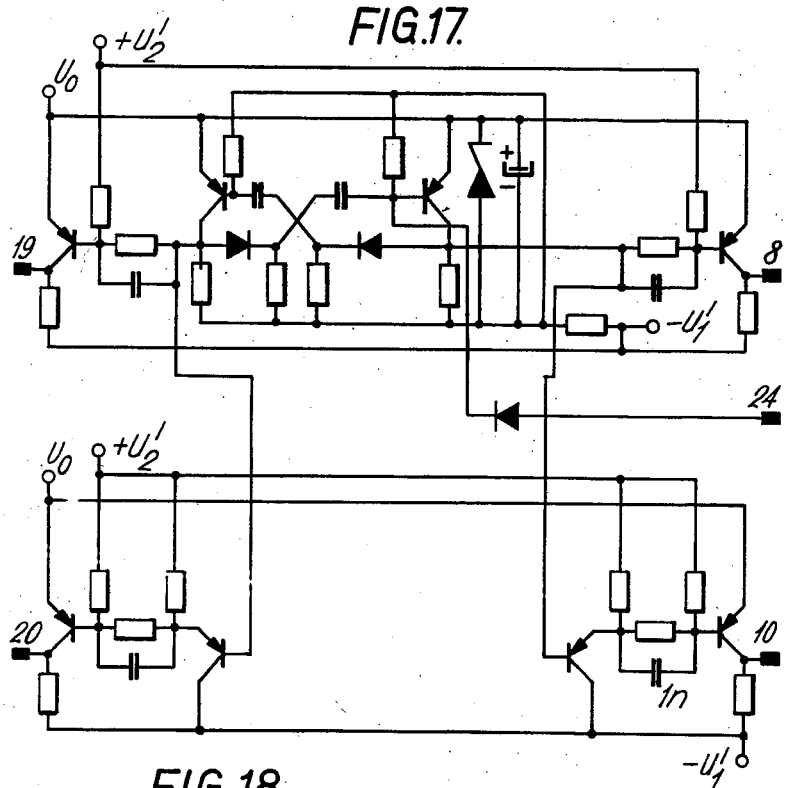

Pulses from the first and second selected product channels of scanning unit 202A are also fed to blend control unit 44 which comprises pulse forming circuits 212, 213 and multivibrator 203 disclosed by FIGURES 16, 18 and 17 respectively.

The circuitry hereinbefore described is printed on cards.

With reference to FIGURES 19, 19A, 19B, 19C, 20 and 22:

Socket panel 45 is provided into which the terminal sockets of circuits 205A, 204A, 209A, 210A, 202A, 203, 211, 210 are fitted as shown. Socket panel 26 is provided into which the terminal sockets of circuits 205A, 204A, 209A, 210A, 202A, 206, 207, 208 and 110 are fitted as shown.

Connections are made by means of the terminal board 47 to read out systems 21 and 22 and by means of sockets 48, 49 and 50 to the preselector switch wiring circuit disclosed by FIG. 20.

With reference to FIGURES 21 and 22:

Signals from the pulse forming circuits 212 and 213 are fed into transformers 51 and 52. The outputs from transformers 51 and 52 are fed into opposite arms of a bridge circuit, the point of balance of which is selected by means of selector switch 39. Double pole switch 53 controlling the actuating mechanism of ganged blend valve 23A and 23B, is actuated when the bridge is unbalanced by current flowing in the bridge, the direction of flow of the current controlling the direction of throw of the switch, and thereby direction of the actuating mechanism of the valves.

I. CONNECTIONS FROM THE TERMINAL BOARD 47 TO THE SOCKET PANEL 45

*Table 1*

| Card 209A | | Terminal Board 47 | | | |
|---|---|---|---|---|---|
| Number | Pin | 1 Decade | 2 Decade | 3 Decade | 4 Decade |
| 0 | 22 | 2E | 2F | 2G | 2H |
| 1 | 23 | 3E | 3F | 3G | 3H |
| 2 | 24 | 4E | 4F | 4G | 4H |
| 3 | 25 | 5E | 5F | 5G | 5H |
| 4 | 1 | 6E | 6F | 6G | 6H |
| 5 | 2 | 7E | 7F | 7G | 7H |
| 6 | 3 | 8E | 8F | 8G | 8H |
| 7 | 4 | 9E | 9F | 9G | 9H |
| 8 | 5 | 10E | 10F | 10G | 10H |
| 9 | 6 | 11E | 11F | 11G | 11H |
| 10 | 7 | 12E | 12F | 12G | 12H |
| 11 | 8 | 13E | 13F | 13G | 13H |

*Table 2*

[Card 205A]

| Symbol | Pin | 1 Decade | 2 Decade | 3 Decade | 4 Decade |
|---|---|---|---|---|---|
| Contact 1 | 24 | 2J | 4J | 9J | 11J |
| Contact 2 | 19 | 3J | 5J | 10J | 12J |
| Contact 3 | 17 | 2K | 4K | 9K | 11K |
| Contact 4 | 10 | 3K | 5K | 10K | 12K |
| Magnet | 3 | 1J | 6J | 8J | 13J |

*Table 3*

[Card 201A]

| Symbol | Pin | Board 47 | Symbol | Pin | Board 47 |
|---|---|---|---|---|---|
| Switch | 1 | 8A | Anode | 18 | 11B |
| Cathode | 2 | 9A | Do | 23 | 13B |
| Anode | 5 | 9B | Switch | 24 | 12A |
| Switch | 16 | 10A | Cathode | 25 | 13A |
| Cathode | 17 | 11A | | | |

Table 4
[Card 204A]

| Symbol | Pin | Board 47 |
|---|---|---|
| Zero-reset | 14 | 12L |

Table 5
[Card 203A]

| Pin | Board 47 | Pin | Board 47 |
|---|---|---|---|
| 3 | 7A | 19 | 10L |
| 6 | 6A | 20 | 11L |
| 8 | 8L | 24 | 7K |
| 10 | 9L | | |

Table 6
[Card 211A]

| Symbol | Pin | Board 47 |
|---|---|---|
| $-U_1'$ | 4 | 7L |

Table 7
[Card 210A]

| Symbol | Pin | Board 47 |
|---|---|---|
| $-U_2''$ | 14 | 6L |
| $+U_2$ | 26 | 2L |
| $+U_2'$ | 27 | 5L |
| $U_0$ | 28 | 3L |
| $-U_1$ | 29 | 4L |

II. CONNECTIONS FROM THE TERMINAL BOARD 4: TO THE SOCKET PANEL 46

Table 8

| Card 209 | | Terminal Board 47 | | | |
|---|---|---|---|---|---|
| Number | Pin | 1 Decade | 2 Decade | 3 Decade | 4 Decade |
| 0 | 22 | 25E | 25F | 25G | 25H |
| 1 | 23 | 24E | 24F | 24G | 24H |
| 2 | 24 | 23E | 23F | 23G | 23H |
| 3 | 25 | 22E | 22F | 22G | 22H |
| 4 | 1 | 21E | 21F | 21G | 21H |
| 5 | 2 | 20E | 20F | 20G | 20H |
| 6 | 3 | 19E | 19F | 19G | 19H |
| 7 | 4 | 18E | 18F | 18G | 18H |
| 8 | 5 | 17E | 17F | 17G | 17H |
| 9 | 6 | 16E | 16F | 16G | 16H |
| 10 | 7 | 15E | 15F | 15G | 15H |
| 11 | 8 | 14E | 14F | 14G | 14H |

Table 9
[Card 205]

| Symbol | Pin | 1 Decade | 2 Decade | 3 Decade | 4 Decade |
|---|---|---|---|---|---|
| Contact 1 | 24 | 25J | 23J | 18J | 16J |
| Contact 2 | 19 | 24J | 22J | 17J | 15J |
| Contact 3 | 17 | 25K | 23K | 18K | 16K |
| Contact 4 | 10 | 24K | 22K | 17K | 15K |
| Magnet | 3 | 26J | 21J | 19J | 14J |

Table 10
[Card 201]

| Symbol | Pin | Board 47 | Symbol | Pin | Board 47 |
|---|---|---|---|---|---|
| Switch | 1 | 19A | Anode | 18 | 16B |
| Cathode | 2 | 18A | Do | 23 | 14B |
| Anode | 5 | 18B | Switch | 24 | 15A |
| Switch | 16 | 17A | Cathode | 25 | 14A |
| Cathode | 17 | 16A | | | |

Table 11
[Card 207]

| Pin | Board 47 |
|---|---|
| 19 | 24A |
| 22 | 26E |
| 23 | 26F |
| 24 | 26G |
| 25 | 26H |

Table 12
[Card 202]

| Pin | Board 47 |
|---|---|
| 8 | 19L |
| 10 | 18L |
| 19 | 17L |
| 20 | 16L |

Table 13
[Card 110]

| Symbol | Pin | Board 47 |
|---|---|---|
| $a_1b_1$ | 1 | 24B |
| f-Cont | 3 | 22A |
| f-Cont | 4 | 22B |
| $-U_1$ | 14 | 23L |
| $d_4$-Cont | 15 | 14C |
| $d_4$-Cont | 16 | 15C |
| $d_3$-Cont. m | 18 | 23A |
| $d_3$-Test | 19 | 16C |
| C-rel. VII | 20 | 26D |
| C-Cont | 25 | 21A |
| C-Cont | 26 | 21B |
| $d_3$-Cont | 17 | 23B |
| $U_0$ | 27 | 24L |

Table 14
[Card 206]

| Pin | Board 47 |
|---|---|
| 1 | 15L |
| 6 | 20K |
| 14 | 20A |

Table 15
[Card 208]

| Symbol | Pin | Board 47 |
|---|---|---|
| I | 24 | 14D |
| II | 23 | 15D |
| III | 22 | 16D |
| IV | 19 | 17D |
| V | 18 | 18D |
| W | 13 | 21D |
| U | 12 | 22D |
| $+U_2$ | 26 | 25L |
| $+U_2'$ | 27 | 22L |
| $-U_1'$ | 30 | 20L |
| $-U_1''$ | 31 | 21L |

III. CONNECTIONS ACROSS TERMINAL BOARD 47

Table 16

| Symbol | Volume | | Board 47 | Price | |
|---|---|---|---|---|---|
| | Card | Pin | | Pin | Card |
| $+U_2$ | 210 | 26 | 2L–25L | 26 | 207b |
| $U_0$ | 210 | 28 | 3L–24L | 27 | 110b |
| $-U_1$ | 210 | 29 | 4L–23L | 14 | 110b |
| $+U_2'$ | 210 | 27 | 5L–22L | 27 | 207b |
| $-U_1''$ | 210 | 14 | 6L–21L | 31 | 207b |
| $-U_1'$ | 211 | 4 | 7L–20L | 30 | 207b |
| Multivibrator | 203 | 8 | 8L–19L | 8 | 202 |
| Do | 203 | 10 | 9L–18L | 10 | 202 |
| Do | 203 | 19 | 10L–17L | 19 | 202 |
| Do | 203 | 20 | 11L–16L | 20 | 202 |
| Multiv.-pulse | 203 | 24 | 7K–20K | 6 | 206 |
| Zero-reset | 204 | 14 | 12L–15L | 1 | 206 |

IV. CONNECTIONS FROM THE TERMINAL BOARD 47 TO THE READ-OUT SYSTEM

Table 17
[Volume Read-Out 22]

| Symbol | Pin | 1 Decade | 2 Decade | 3 Decade | 4 Decade |
|---|---|---|---|---|---|
| Contact 1 | A | 2J | 4J | 9J | 11J |
| Contact 2 | B | 3J | 5J | 10J | 12J |
| Contact 3 | C | 2K | 4K | 9K | 11K |
| Contact 4 | D | 3K | 5K | 10K | 12K |
| $U_0$ | F | 1G | 1G | 1G | 1G |
| Magnet | E | 1J | 6J | 8J | 13J |
| $-U_1$ magnet | H | 1F | 1F | 1F | 1F |

Table 18
[Price Read-Out 21]

| Symbol | Pin | 1 Decade | 2 Decade | 3 Decade | 4 Decade |
|---|---|---|---|---|---|
| Contact 1 | A | 25J | 23J | 18J | 16J |
| Contact 2 | B | 24J | 22J | 17J | 15J |
| Contact 3 | C | 25K | 23K | 18K | 16K |
| Contact 4 | D | 24K | 22K | 17K | 15K |
| $U_0$ | F | 1G | 1G | 1G | 1G |
| Magnet | E | 26J | 21J | 19J | 14J |
| $-U_1$ magnet | H | 1F | 1F | 1F | 1F |

Table 19
[Motor]

| Symbol | Pin | Board 47 |
|---|---|---|
| 220 volt | D | 1C |
| Do | H | 2C |

V. CONNECTIONS FROM THE TERMINAL BOARD 47 THROUGH THE SOCKETS 48, 49 AND 50 TO THE SWITCHES

Table 20

| Board 47 | Socket | Pin | Switch | Level | Contact |
|---|---|---|---|---|---|
| 2E | 48 | A | 3 | 1 | 0 |
| 3E | 48 | B | 3 | 1 | 1 |
| 4E | 48 | C | 3 | 1 | 2 |
| 5E | 48 | D | 3 | 1 | 3 |
| 6E | 48 | E | 3 | 1 | 4 |
| 7E | 48 | F | 3 | 1 | 5 |
| 8E | 48 | H | 3 | 1 | 6 |
| 9E | 48 | J | 3 | 1 | 7 |
| 10E | 48 | K | 3 | 1 | 8 |
| 11E | 48 | L | 3 | 1 | 9 |
| 2F | 48 | M | | | |
| 7F | 48 | T | 5 | 3 | 1 |
| 11F | 48 | X | 5 | 4 | 1 |
| 4G | 48 | AA | | | |
| 6G | 48 | CC | 1 | 2 | 1;3;5 ... |
| 11G | 48 | JJ | 1 | 2 | 2;4;6 ... |
| 2H | 48 | KK | 1 | 1 | 1;2 |
| 3H | 48 | LL | 1 | 1 | 3;4 |
| 4H | 48 | MM | 1 | 1 | 5;6 |
| 5H | 48 | NN | 1 | 1 | 7;8 |
| 6H | 49 | A | 1 | 1 | 9;10 |
| 7H | 49 | B | 1 | 1 | 11;12 |
| 8H | 49 | C | 1 | 1 | 13;14 |
| 9H | 49 | D | 1 | 1 | 15;16 |
| 10H | 49 | E | 1 | 1 | 17;18 |
| 11H | 49 | F | 1 | 1 | 19 |
| 20E | 49 | H | 4 | 1 | 5 |
| 21E | 49 | J | 4 | 1 | 4 |
| 22E | 49 | K | 4 | 1 | 3 |
| 23E | 49 | L | 4 | 1 | 2 |
| 24E | 49 | M | 4 | 1 | 1 |
| 25E | 49 | N | 4 | 1 | 0 |
| 26D | 49 | P | 5 | 6 | M |
| 18D | 49 | T | 5 | 5 | M |
| 22D | 49 | U | 5 | 4 | 2 |
| 17D | 49 | V | 5 | 4 | M |
| 21D | 49 | W | 5 | 3 | 2 |
| 16D | 49 | Y | 5 | 3 | M |
| 15D | 49 | Z | 5 | 2 | M |
| 14D | 49 | AA | 5 | 1 | M |
| 26H | 49 | BB | 1 | 1 | 1 |
| 26G | 49 | CC | | | |
| 24D | 49 | DD | 1 | 3 | M |
| 26F | 49 | EE | | | |
| 26E | 49 | FF | 3 | 1 | 0 |
| 3C | 49 | MM | 5 | 7 | M |
| 4C | 49 | NN | | | Lamps |
| 19E | 50 | NN | 4 | 1 | 6 |
| 18E | 50 | MM | 4 | 1 | 7 |

Table 20—Continued

| Board 47 | Socket | Pin | Switch | Level | Contact |
|---|---|---|---|---|---|
| 17E | 50 | LL | 4 | 1 | 8 |
| 16E | 50 | KK | 4 | 1 | 9 |
| 20F | 50 | CC | 5 | 1 | 3 |
| 16F | 50 | Y | 5 | 4 | 3 |
| 21G | 50 | T | 2 | 2 | 1;3;5 ... |
| 16G | 50 | M | 2 | 2 | 2;4;6 ... |
| 25H | 50 | L | 2 | 1 | 1;2 |
| 24H | 50 | K | 2 | 1 | 3;4 |
| 23H | 50 | J | 2 | 1 | 5;6 |
| 22H | 50 | H | 2 | 1 | 7;8 |
| 21H | 50 | F | 2 | 1 | 9;10 |
| 20H | 50 | E | 2 | 1 | 11;12 |
| 19H | 50 | D | 2 | 1 | 13;14 |
| 18H | 50 | C | 2 | 1 | 15;16 |
| 17H | 50 | B | 2 | 1 | 17;18 |
| 16H | 50 | A | 2 | 1 | 19 |

VI. BRIDGE CONNECTIONS ACROSS THE SOCKETS

Table 21

| Socket | Pin | to | Socket | Pin |
|---|---|---|---|---|
| 48 | M | ------ | 49 | EE |
| 48 | AA | ------ | 49 | CC |

VII. CONNECTIONS BETWEEN THE SWITCHES

Table 22

| Switch | Level | Contact | Switch | Level | Contact |
|---|---|---|---|---|---|
| 1 | 1 | M | 5 | 1 | 1 |
| 1 | 2 | M | 5 | 2 | 1 |
| 1 | 3 | M | 5 | 3 | 0 |
| 1 | 3 | O | 5 | 6 | 1 |
| 2 | 1 | M | 5 | 3 | 3 |
| 2 | 2 | M | 5 | 2 | 3 |
| 2 | 3 | M | 5 | 6 | 3 |
| 3 | 1 | M | 5 | 5 | 1 |
| 4 | 1 | M | 5 | 5 | 3 |

VIII. CONNECTIONS TO THE TERMINAL BOARD 47

Table 23

| | Volume | | | Price | | |
|---|---|---|---|---|---|---|
| Symbol | Premium | Diesel | Regular | Premium | Diesel | Regular |
| Cathode | 13A | 11A | 9A | 14A | 16A | 18A |
| Anode | 13B | 11B | 9B | 14B | 16B | 18B |
| Selector switch | 12A | 10A | 8A | 15A | 17A | 19A |
| $-U_1'$ | 12B | 10B | 8B | 15B | 17B | 19B |

Table 24

| Symbol | Board 47 | Symbol | Board 47 |
|---|---|---|---|
| 220 volt | 1A | Zero reset $U_0$ | 20B |
| Do | 2A | C-contact | 21A |
| Lamp | 3A | C-contact | 21B |
| Do | 4A | F-contact | 22A |
| $-U_1$ | 26A | F-contact | 22B |
| $U_0$ | 26B | $a_1b_1$-Contact | 24A |
| $+U_2$ | 26C | $a_1b_1$-Contact | 24B |
| Blend control "S" | 6A | $d_3$-Contact | 23B |
| Blend control $U_0$ | 6B | $d_3$-Centre contact | 23A |
| Blend control "B" | 7A | $d_3$-Test contact | 16C |
| Blend control $U_0$ | 7B | $d_4$-Contact | 14C |
| Zero reset "G" | 20A | $d_4$-Contact | 15C |

We claim:
1. A metering system comprising two meters, each meter (a) being adapted for use in association with a fluid stream to measure a property of the stream, (b) when in use being in association with a different fluid stream and (c) each meter being connected to an electrical variable pulse rate signal transmitter whereby there is provided a signal train, the train during a given period being characteristic of the value of the property measured by the meter; said system also comprising an electrical summating unit including means responsive to pulse rate and adapted to receive simultaneously a signal train derived from each of the transmitters and adapted to provide an output train of electrical signals which is characteristic of the sum of the values of the property measured by the two meters during said period.

2. A metering system comprising more than two meters, each meter (a) being adapted for use in association with a fluid stream to measure a property of the stream (b) when in use being in association with a different fluid stream and (c) each meter being connected to an electrical signal transmitter operable independently of the other signal transmitters whereby there is provided a signal train for each said meter, the train during a given period being characteristic of the value of the property measured by the meter; said system also comprising an electrical summating unit adapted to receive, simultaneously, signal trains from any number of transmitters, and comprising a switch adapted to connect any number of said transmitters during said period to said electrical summating unit, said electrical summating unit being adapted to provide an output train of electrical signals which is characteristic of the sum of the values of the property measured in respect of each stream in which the meter in association therewith is connected to a transmitter connected by means of said switch to said summating unit.

3. A metering system comprising two meters, each meter (a) being adapted for use in a fluid stream and being responsive to the rate of flow of fluid passing in association with the meter, (b) being, in use, connected to a different fluid stream and (c) each meter being connected to a variable frequency electrical impulse generating signal transmitter whereby there is provided a first signal train, the train being characteristic of the quantity of fluid passing in association with the meter during a given period, and a second signal train, the train being characteristic of the total price of fluid passing in association with the meter during said period, said system also comprising an electrical summating unit including counting means and adapted to receive simultaneously said first and second signal trains derived from each transmitter and adapted to provide two output trains of electrical signals one of which is characteristic of the sum of the quantities, the other of which is characteristic of the sum of the total prices of fluids passing in association with the meters during said period.

4. A metering system comprising more than two meters, each meter (a) being adapted for use in a fluid stream and being responsive to the rate of flow of fluid passing in association with the meter, (b) being, in use, connected to a different fluid stream and (c) each meter being connected to a variable frequency pulse generating transmitter whereby there is provided a first signal train, the train being characteristic of the quantity of fluid passing in association with the meter during a given period and a second signal train, the train being characteristic of the total price of fluid passing in association with the meter during said period; said system also comprising an electrical summating unit having pulse rate responsive means and adapted to receive simultaneously first and second signal trains derived from any number of transmitters, and comprising a switch adapted to connect any number of said transmitters during said period to said electrical summating unit, said electrical summating unit being adapted to provide two output trains of electrical signals one of which is characteristic of the sum of the quantities, the other of which characteristic of the sum of the total prices of fluid measured in respect of each stream in which the meter in association therewith is connected to a transmitter connected by means of said switch to said summating unit.

5. A metering system according to claim 3 comprising two of said electrical summating units, a first unit being adapted to summate trains of signals which are characteristic of quantity, a second unit being adapted to summate trains of signals which are characteristic of total price.

6. A metering system according to claim 5 wherein the signal train provided by each electrical signal transmitter is a pulse train.

7. A metering system comprsing two meters, each meter (a) being adapted for use in a fluid stream and being responsive to the rate of flow of fluid passing in association with the meter, (b) being, in use, connected to a different fluid stream and (c) being connected to an electrical signal transmitter whereby there is provided a first signal pulse train, the train being characteristic of the quantity of fluid passing in association with the meter during a given period, and a second signal pulse train, the second train being characteristic of the total price of fluid passing in association with the meter during said period, said system also comprising pulse shaping circuits adapted to shape each of said pulse trains to rectangular waveform, and electrical summating means adapted to receive simultaneously said first and second signal trains derived from each transmitter and adapted to provide two output trains of electrical signals one of which is characteristic of the sum of the quantities, the other of which is characteristic of the sum of the total prices of fluids passing in association with the meters during said period, said summating means including a first summating unit adapted to summate said first trains characteristic of quantity and a second summating unit adapted to summate said second trains characteristic of total price.

8. A metering system according to claim 7 wherein said summating unit comprises a scanning unit adapted to scan each shaped pulse train at least twice during the duration of each pulse and adapted to give rise to a signal when a shaped pulse is detected on at least two occasions during the duration of the pulse.

9. A metering system according to claim 8 wherein said summating unit comprises an integrating unit adapted to receive signals from said scanning unit and adapted to give rise to two consecutive signals when two signals are received simultaneously from said scanning unit.

10. A metering system according to claim 9 wherein said summating unit comprises a digital electronic counter adapted to receive signals from said integrating unit.

11. A metering system according to claim 10 wherein each output signal from each electrical unit is a pulse train.

12. A liquid product dispensing unit comprising a metering system according to claim 1, a read-out system and a set of storage tanks, each tank being provided to contain a different liquid product and having associated therewith a pump and one of said meters.

13. A liquid product dispensing unit according to claim 12 wherein said storage tanks, pumps and meters are located below ground level, as hereinbefore defined, and said read-out system is located above ground level.

14. A liquid product dispensing unit according to claim 13 wherein said read-out system is portable.

15. A liquid product dispensing unit according to claim 14, for use in dispensing fuel to vehicles, comprising two read-out systems adapted to operate electrically in parallel, a first system comprised in a fixed unit, located to provide indication to operating personnel and a second system comprised in a portable unit adapted for location to provide indication at the driving position of a vehicle.

References Cited in the file of this patent

UNITED STATES PATENTS

| | | |
|---|---|---|
| 2,510,093 | Ferguson et al. | June 6, 1950 |
| 2,898,040 | Steele | Aug. 4, 1959 |
| 2,931,538 | Young et al. | Apr. 5, 1960 |
| 2,998,187 | Wollar | Aug. 29, 1961 |
| 3,027,048 | Rapisarda | Mar. 27, 1962 |
| 3,033,421 | Henderson | May 8, 1962 |
| 3,036,585 | Shawhan | May 29, 1962 |